United States Patent
Lee

(10) Patent No.: US 11,893,069 B2
(45) Date of Patent: Feb. 6, 2024

(54) PLATFORM, METHOD, AND SYSTEM FOR A SEARCH ENGINE OF TIME SERIES DATA

(71) Applicant: Jencir Lee, London (GB)

(72) Inventor: Jencir Lee, London (GB)

(*) Notice: Subject to any disclaimer, the term of this patent is extended or adjusted under 35 U.S.C. 154(b) by 71 days.

(21) Appl. No.: 17/196,850

(22) Filed: Mar. 9, 2021

(65) Prior Publication Data
US 2021/0286853 A1    Sep. 16, 2021

Related U.S. Application Data

(60) Provisional application No. 62/988,389, filed on Mar. 11, 2020.

(51) Int. Cl.
| | |
|---|---|
| *G06F 16/00* | (2019.01) |
| *G06F 16/9535* | (2019.01) |
| *G06F 16/9538* | (2019.01) |
| *G06N 3/02* | (2006.01) |
| *G06F 9/451* | (2018.01) |
| *G06F 16/2457* | (2019.01) |

(52) U.S. Cl.
CPC .......... *G06F 16/9535* (2019.01); *G06F 9/451* (2018.02); *G06F 16/24578* (2019.01); *G06F 16/9538* (2019.01); *G06N 3/02* (2013.01)

(58) Field of Classification Search
CPC ................. G06F 16/9535; G06F 9/451; G06F 16/24578; G06F 16/9538; G06F 16/9532; G06N 3/02; G06N 5/003; G06N 20/20; G06N 3/0445; G06N 3/08
USPC ................................................ 707/600–899
See application file for complete search history.

(56) References Cited

U.S. PATENT DOCUMENTS

| | | | |
|---|---|---|---|
| 10,089,144 B1 * | 10/2018 | Nagpal | ............... G06F 16/2455 |
| 2016/0224803 A1 * | 8/2016 | Frank | .................. G06F 21/6245 |
| 2018/0121986 A1 * | 5/2018 | Akkiraju | ............ G06Q 30/0631 |
| 2018/0314573 A1 * | 11/2018 | Chang | .................... G06N 20/00 |

* cited by examiner

*Primary Examiner* — Irete F Ehichioya
*Assistant Examiner* — Shirley D Hicks
(74) *Attorney, Agent, or Firm* — LAW OFFICE OF ALEXIS J SAENZ

(57) ABSTRACT

A system, method, and computer program product provide a search engine which may use time series of data relevant to a search query to generate relevant results that may be used for predictions of events related to the query. Embodiments determine the underlying driving factors that most influenced the search query topic. In one aspect, the predictive ability of time series may be used to determine the driving factors. In another aspect, the system and method may employ a neural network to run a prediction model for determining conditional distribution of future values of the search query topic. The information may be displayed in a user interface where the driving factors and other information may be user edited to observe the effects source data has on the search query topic.

14 Claims, 29 Drawing Sheets

- The Warren Buffett Portfolio for Novice Investors | Personal ... Lexington Clipper Herald | 4 hours ago
- Markets sag after another bond-yield inflation hint Northwest Arkansas Democrat-Gazette | 6 hours ago

Driving Factors

1PA | 5PA

|  | 10-Year Treasury Constant Maturity Rate Minus 2-Year Treasury Constant Maturity | General Electric | 12-Month LIBOR on CHF | Apple In |
|---|---|---|---|---|
| Sector |  | Manufacturing |  | Manufac |
| Industry |  | Aircraft Engine and Engine Parts Manufacturing |  | Electron Compute Manufac |
| Shapley Value | -0.041 | -0.03 | -0.017 | -0.022 |
| Importance | 100.0% | 99.7% | 99.4% | 99.0% |

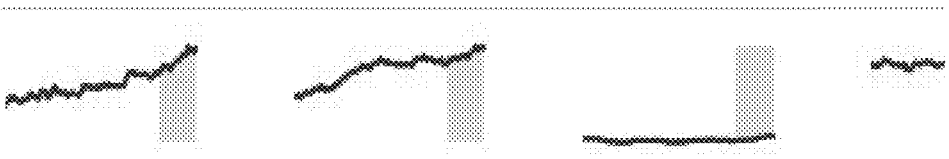

FIG. 9B

Search instrument name with text | Run

S&P 500

( DRIVERS )  ( PRED )  ( TRADING )

Settings n periods-ahead

⊙ 1PA  ○ 5PA

Pre-populate with Importance Over

0.95

Selected Predictive Factors

| | 10-Year Treasury Constant Maturity Rate Minus 2-Year Treasury Constant Maturity | General Electric | 12-Month LIBOR on CHF | Apple In |
|---|---|---|---|---|
| |  | | | |
| Shapley Value | -0.041 | -0.03 | -0.017 | -0.022 |
| Importance | 100.0% | 99.7% | 99.4% | 99.0% |

Update Predictions

Predictions

| | actual | expected | 1% qtl | 5% qtl | 15% qtl | 50% qtl | 85% q |
|---|---|---|---|---|---|---|---|
| 2021-02-01 00:00:00 | 3773.86 | 3776.68 | 3726.35 | 3730.42 | 3740.63 | 3776.95 | 3812.5 |
| 2021-02-02 00:00:00 | 3826.31 | inf | 3790.56 | 3793.43 | 3801.15 | 3831.14 | 3861.4 |
| 2021-02-03 00:00:00 | 3830.17 | inf | 3803.14 | 3806.07 | 3813.37 | 3839.83 | 3863.8 |
| 2021- | 3871.74 | inf | 3832.92 | 3835.92 | 3844.08 | 3876.13 | inf |

| | | | | | | | |
|---|---|---|---|---|---|---|---|
| 02-04 00:00:00 | | | | | | | |
| 2021-02-05 00:00:00 | 3886.83 | 3892.84 | 3868.07 | 3869.8 | 3874.55 | 3893.53 | 3910.4 |
| 2021-02-08 00:00:00 | 3915.59 | 3919.66 | 3899.62 | 3900.93 | 3904.64 | 3920.18 | 3934.1 |
| 2021-02-09 00:00:00 | 3911.23 | 3915.73 | 3896.08 | 3897.41 | 3901.11 | 3916.29 | 3929.7 |
| 2021-02-10 00:00:00 | 3909.88 | 3915.07 | 3893.77 | 3895.19 | 3899.19 | 3915.69 | 3930.3 |
| 2021-02-11 00:00:00 | 3916.38 | 3919.35 | 3896.97 | 3898.38 | 3902.39 | 3919.66 | 3936.0 |
| 2021-02-12 00:00:00 | 3934.83 | 3935.13 | 3921.9 | 3922.65 | 3924.87 | 3935.19 | 3945.3 |
| 2021-02-15 00:00:00 | nan | 3941.11 | 3915.68 | 3917.45 | 3922.32 | 3941.84 | 3959.1 |
| 2021-02-16 00:00:00 | 3932.59 | 3934.23 | 3922.86 | 3923.58 | 3925.63 | 3934.51 | 3942.5 |
| 2021-02-17 00:00:00 | 3931.33 | inf | 3904.14 | 3906.81 | 3913.78 | 3940.28 | 3965.8 |
| 2021-02-18 | 3913.97 | 3918.66 | 3890.16 | 3892.15 | 3897.59 | 3919.26 | 3939.1 |

FIG. 10C

| | | | | | | | |
|---|---|---|---|---|---|---|---|
| 00:00:00 | | | | | | | |
| 2021-02-19 00:00:00 | 3906.71 | 3907.98 | 3888.41 | 3889.62 | 3893.09 | 3908.21 | 3922.6 |
| 2021-02-22 00:00:00 | 3876.5 | nan | -inf | -inf | 3845.12 | 3889.0 | inf |
| 2021-02-23 00:00:00 | 3881.37 | 3887.21 | 3859.35 | 3861.31 | 3866.66 | 3887.77 | 3907.2! |
| 2021-02-24 00:00:00 | 3925.43 | 3929.55 | 3894.9 | 3897.26 | 3903.73 | 3929.74 | 3955.2 |
| 2021-02-25 00:00:00 | 3829.34 | nan | -inf | -inf | -inf | 3848.74 | inf |
| 2021-02-26 00:00:00 | 3811.15 | inf | 3766.46 | 3771.64 | 3783.22 | 3821.55 | inf |
| 2021-02-28 00:00:00 | nan | inf | 3757.34 | 3763.62 | 3776.37 | 3816.86 | 3857.5( |
| 2021-03-01 00:00:00 | 3901.82 | -inf | -inf | 3859.33 | 3868.93 | 3901.96 | 3934.2 |
| 2021-03-02 00:00:00 | 3870.29 | nan | -inf | 3832.38 | 3843.93 | 3881.0 | 3918.6: |
| 2021-03-03 00:00:00 | 3819.72 | 3826.04 | 3799.51 | 3801.36 | 3806.43 | 3826.75 | 3844.9 |

FIG. 10D

Goodness of Density Forecast

A statistic with value between 0 and 1, the higher the better. A value below 0.01 indicates deteriorating goodness.

|          | SP500  |
|----------|--------|
| Period   | 0.5206 |
| By Month |        |
| 2021-02  | 0.591  |
| 2021-03  | 0.3217 |

For a perfectly forecast period, the cdf curve should look like . If it is closer to , the realisations were less volatile than forecast; if it is closer to , the realisations were more volatile than forecast.

Period

FIG. 10E

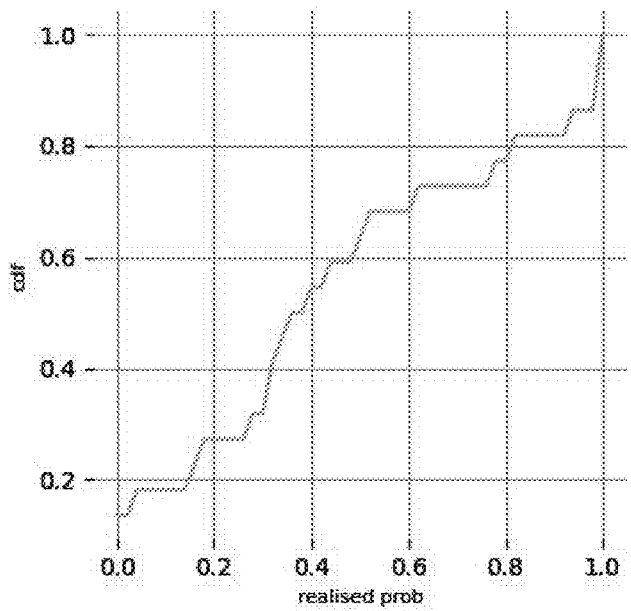
2021-02                                    2021-03
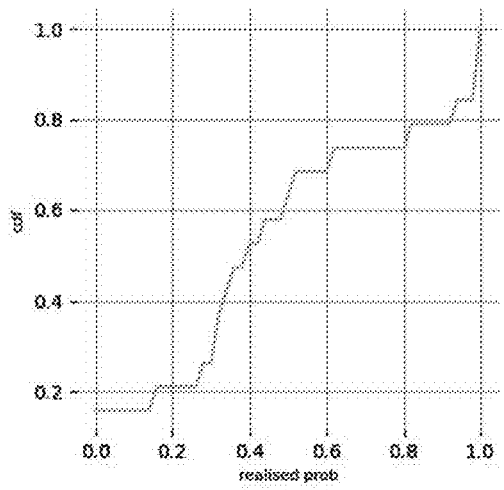 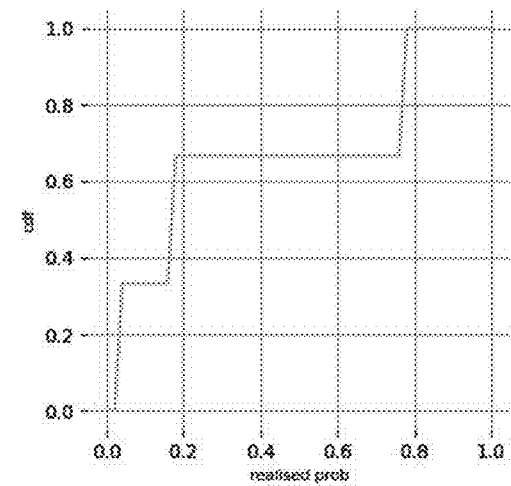
FIG. 10F

| Search instrument name with text | Run |

S&P 500

( DRIVERS )  ( PRED )  ( TRADING )

Settings n periods-ahead

◉ 1PA  ○ 5PA

Pre-populate with Importance Over

| 0.99 |

Selected Predictive Factors

| | 10-Year Treasury Constant Maturity Rate Minus 2-Year Treasury Constant Maturity | General Electric | 12-Month LIBOR on CHF | Apple In |
|---|---|---|---|---|
| |  | | | |
| Shapley Value | -0.041 | -0.03 | -0.017 | -0.022 |
| Importance | 100.0% | 99.7% | 99.4% | 99.0% |

Update Predictions

Predictions

| | actual | expected | 1% qtl | 5% qtl | 15% qtl | 50% qtl | 85% q |
|---|---|---|---|---|---|---|---|
| 2021-02-01 00:00:00 | 3773.86 | nan | -inf | -inf | 3727.26 | 3775.34 | 3823.9 |
| 2021-02-02 00:00:00 | 3826.31 | 3830.35 | 3782.63 | 3786.36 | 3795.91 | 3830.48 | 3864.7 |
| 2021-02-03 00:00:00 | 3830.17 | 3837.25 | 3796.41 | 3799.39 | 3807.38 | 3837.68 | 3866.7 |
| 2021- | 3871.74 | 3870.33 | 3823.92 | 3827.27 | 3836.34 | 3870.62 | 3904.0 |

| | | | | | | | |
|---|---|---|---|---|---|---|---|
| 02-04 00:00:00 | | | | | | | |
| 2021-02-05 00:00:00 | 3886.83 | 3894.2 | 3848.06 | 3851.64 | 3860.84 | 3894.41 | 3927.4! |
| 2021-02-08 00:00:00 | 3915.59 | 3919.79 | 3893.01 | 3894.76 | 3899.69 | 3920.29 | 3939.4 |
| 2021-02-09 00:00:00 | 3911.23 | 3914.6 | 3887.36 | 3889.13 | 3894.14 | 3915.1 | 3934.5 |
| 2021-02-10 00:00:00 | 3909.88 | 3914.16 | 3887.38 | 3889.15 | 3894.13 | 3914.73 | 3933.6 |
| 2021-02-11 00:00:00 | 3916.38 | 3918.82 | 3895.62 | 3897.07 | 3901.25 | 3919.21 | 3936.0 |
| 2021-02-12 00:00:00 | 3934.83 | 3935.27 | 3914.47 | 3915.69 | 3919.28 | 3935.43 | 3951.1 |
| 2021-02-15 00:00:00 | nan | 3938.5 | 3908.41 | 3910.39 | 3915.97 | 3938.99 | 3960.5 |
| 2021-02-16 00:00:00 | 3932.59 | 3934.5 | 3911.09 | 3912.54 | 3916.71 | 3934.8 | 3951.9! |
| 2021-02-17 00:00:00 | 3931.33 | nan | -inf | -inf | 3893.06 | 3943.22 | inf |
| 2021-02-18 | 3913.97 | inf | 3864.75 | 3870.34 | 3882.76 | 3923.77 | 3966.1' |

FIG. 11C

| | | | | | | | |
|---|---|---|---|---|---|---|---|
| 00:00:00 | | | | | | | |
| 2021-02-19 00:00:00 | 3906.71 | 3909.8 | 3872.57 | 3875.13 | 3882.18 | 3910.12 | 3937.1! |
| 2021-02-22 00:00:00 | 3876.5 | nan | -inf | -inf | -inf | 3886.23 | inf |
| 2021-02-23 00:00:00 | 3881.37 | 3886.9 | 3847.35 | 3850.31 | 3857.98 | 3887.29 | 3915.5, |
| 2021-02-24 00:00:00 | 3925.43 | 3927.59 | 3902.19 | 3903.77 | 3908.33 | 3927.93 | 3946.5 |
| 2021-02-25 00:00:00 | 3829.34 | nan | -inf | -inf | -inf | 3843.34 | inf |
| 2021-02-26 00:00:00 | 3811.15 | -inf | -inf | 3771.54 | 3781.92 | 3817.54 | 3853.4 |
| 2021-03-01 00:00:00 | 3901.82 | nan | -inf | -inf | -inf | 3898.69 | 3949.3 |
| 2021-03-02 00:00:00 | 3870.29 | nan | -inf | -inf | 3821.94 | 3879.89 | inf |
| 2021-03-03 00:00:00 | 3819.72 | 3824.8 | 3782.33 | 3785.38 | 3793.56 | 3825.02 | 3855.8 |

Goodness of Density Forecast

FIG. 11D

A statistic with value between 0 and 1, the higher the better. A value below 0.01 indicates deteriorating goodness.
|         | SP500  |
| ------- | ------ |
| Period  | 0.599  |
| By Month |       |
| 2021-02 | 0.6658 |
| 2021-03 | 0.6955 |
For a perfectly forecast period, the cdf curve should look like . If it is closer to , the realisations were less volatile than forecast; if it is closer to 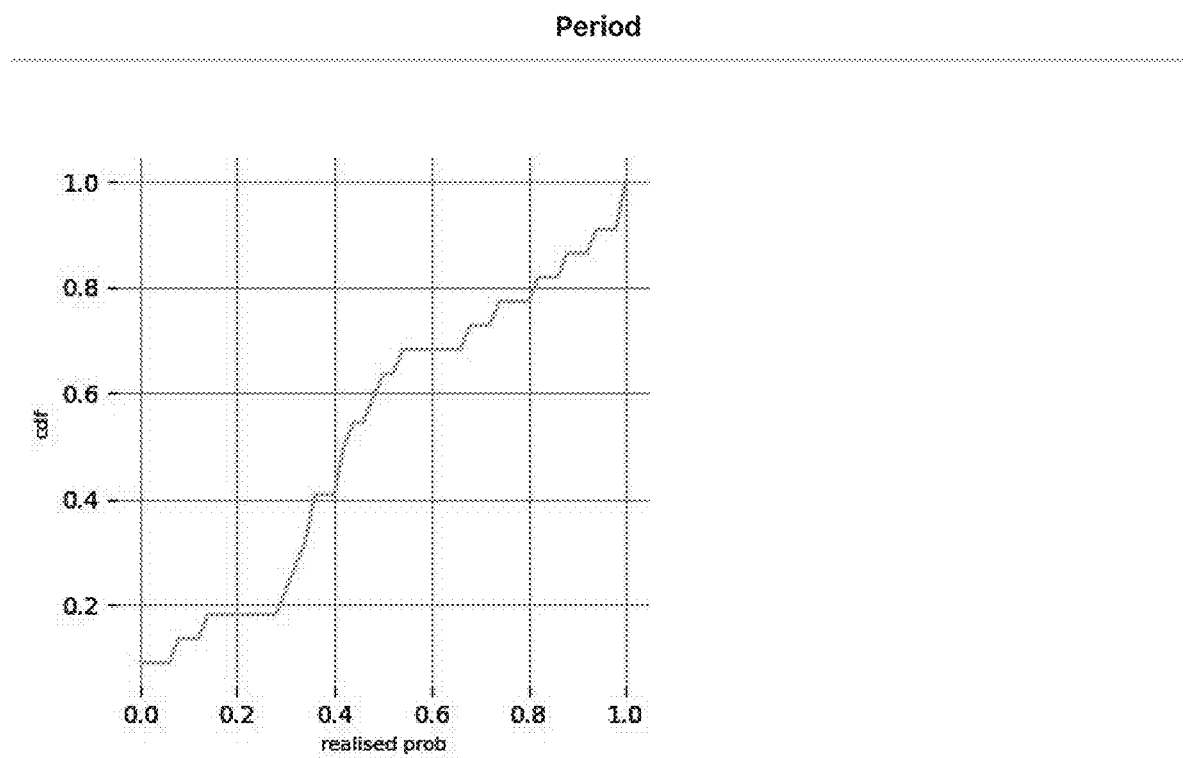, the realisations were more volatile than forecast.
Period
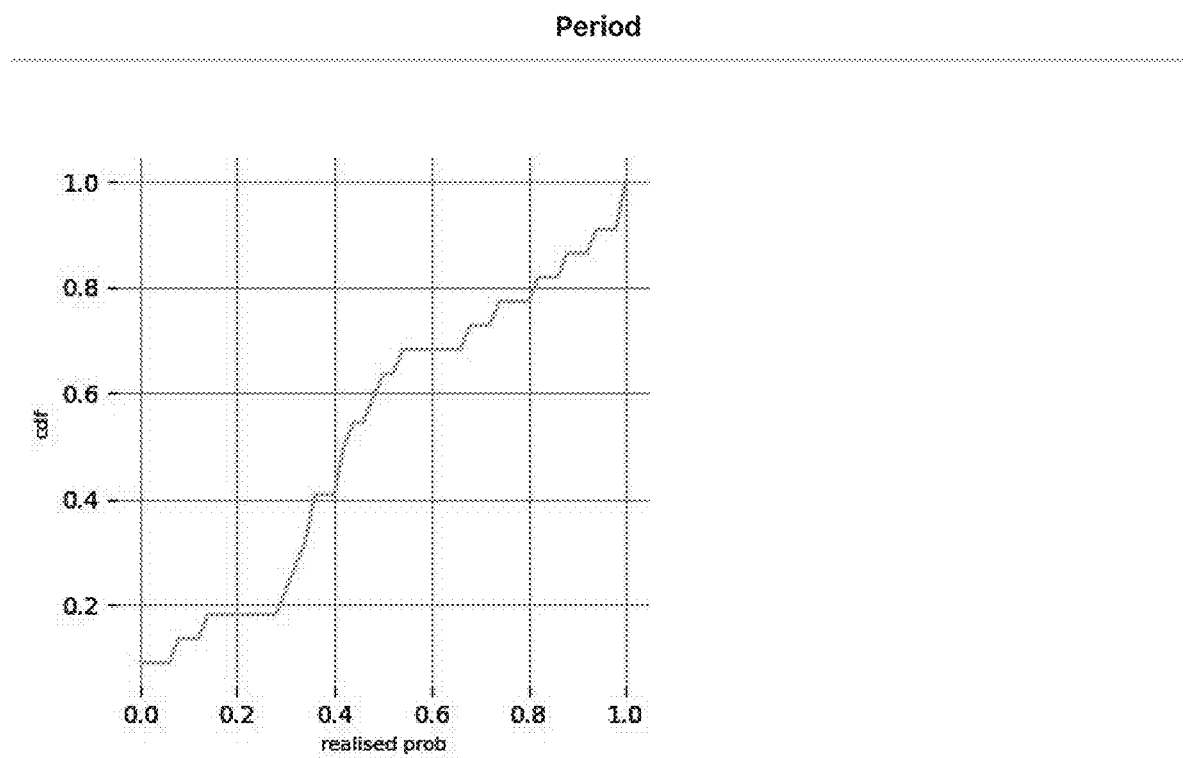
FIG. 11E

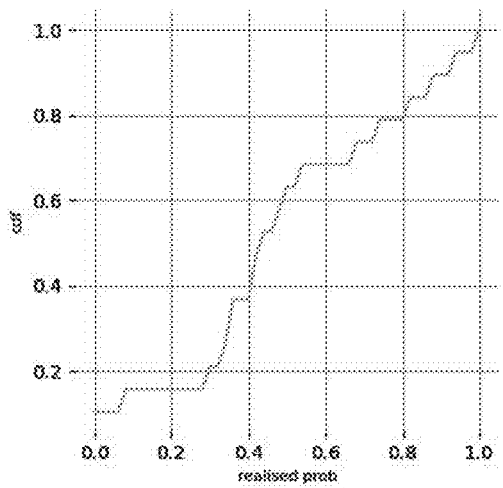
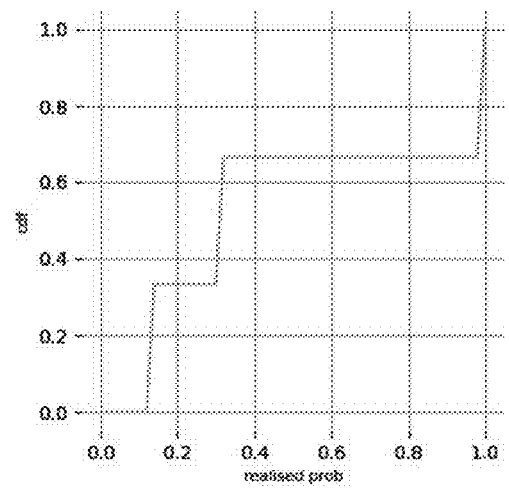
FIG. 11F

| Search instrument name with text | Run |

S&P 500

( DRIVERS )  ( PRED )  ( TRADING )

Settings n periods-ahead

◉ 1PA  ○ 5PA

Pre-populate with Importance Over

| 0.99 |

Selected Predictive Factors

| | 3-Month LIBOR on USD |
|---|---|
| |  |
| Shapley Value | -0.012 |
| Importance | 87.5% |

Update Predictions

Predictions

|  | actual | expected | 1% qtl | 5% qtl | 15% qtl | 50% qtl | 85% q |
|---|---|---|---|---|---|---|---|
| 2021-02-01 00:00:00 | 3773.86 | 3776.0 | 3748.2 | 3749.88 | 3754.76 | 3776.16 | 3797.1 |
| 2021-02-02 00:00:00 | 3826.31 | 3828.97 | 3803.13 | 3804.68 | 3809.21 | 3829.17 | 3848.5 |
| 2021-02-03 00:00:00 | 3830.17 | 3832.49 | 3808.51 | 3809.95 | 3814.14 | 3832.6 | 3850.7 |
| 2021- | 3871.74 | 3873.32 | 3853.16 | 3854.33 | 3857.79 | 3873.47 | 3888.7 |

| | | | | | | | |
|---|---|---|---|---|---|---|---|
| 02-04 00:00:00 | | | | | | | |
| 2021-02-05 00:00:00 | 3886.83 | 3888.33 | 3872.4 | 3873.3 | 3875.98 | 3888.47 | 3900.5 |
| 2021-02-08 00:00:00 | 3915.59 | 3917.12 | 3899.34 | 3900.34 | 3903.32 | 3917.18 | 3930.8 |
| 2021-02-09 00:00:00 | 3911.23 | 3912.78 | 3891.1 | 3892.34 | 3896.02 | 3912.87 | 3929.4 |
| 2021-02-10 00:00:00 | 3909.88 | 3911.64 | 3889.31 | 3890.6 | 3894.43 | 3911.8 | 3928.6 |
| 2021-02-11 00:00:00 | 3916.38 | 3918.01 | 3899.53 | 3900.58 | 3903.72 | 3918.16 | 3932.1 |
| 2021-02-12 00:00:00 | 3934.83 | 3936.32 | 3918.73 | 3919.74 | 3922.74 | 3936.49 | 3949.7 |
| 2021-02-15 00:00:00 | nan | 3936.6 | 3918.79 | 3919.81 | 3922.83 | 3936.78 | 3950.2 |
| 2021-02-16 00:00:00 | 3932.59 | 3934.24 | 3915.89 | 3916.94 | 3920.06 | 3934.41 | 3948.2 |
| 2021-02-17 00:00:00 | 3931.33 | 3932.92 | 3909.28 | 3910.65 | 3914.72 | 3933.07 | 3950.9 |
| 2021-02-18 | 3913.97 | 3916.6 | 3891.66 | 3893.14 | 3897.5 | 3916.8 | 3935.5 |

FIG. 12C

| | | | | | | | |
|---|---|---|---|---|---|---|---|
| 00:00:00 | | | | | | | |
| 2021-02-19 00:00:00 | 3906.71 | 3908.28 | 3881.41 | 3883.01 | 3887.68 | 3908.43 | 3928.7 |
| 2021-02-22 00:00:00 | 3876.5 | 3878.98 | 3854.05 | 3855.55 | 3859.91 | 3879.2 | 3897.8 |
| 2021-02-23 00:00:00 | 3881.37 | 3883.64 | 3848.53 | 3850.77 | 3857.08 | 3883.56 | 3910.2 |
| 2021-02-24 00:00:00 | 3925.43 | 3927.87 | 3894.93 | 3896.99 | 3902.87 | 3927.94 | 3952.8 |
| 2021-02-25 00:00:00 | 3829.34 | 3831.39 | 3807.12 | 3808.53 | 3812.71 | 3831.49 | 3849.9 |
| 2021-02-26 00:00:00 | 3811.15 | 3812.58 | 3794.89 | 3795.9 | 3798.9 | 3812.7 | 3826.1 |
| 2021-03-01 00:00:00 | 3901.82 | 3903.19 | 3885.66 | 3886.66 | 3889.62 | 3903.31 | 3916.6 |
| 2021-03-02 00:00:00 | 3870.29 | 3872.13 | 3855.19 | 3856.15 | 3859.01 | 3872.29 | 3885.1 |
| 2021-03-03 00:00:00 | 3819.72 | 3821.4 | 3792.63 | 3794.36 | 3799.38 | 3821.42 | 3843.4 |

Goodness of Density Forecast

FIG. 12D

A statistic with value between 0 and 1, the higher the better. A value below 0.01 indicates deteriorating goodness.

|  | SP500 |
| --- | --- |
| Period | 0.1761 |
| By Month |  |
| 2021-02 | 0.3109 |
| 2021-03 | 0.0741 |

For a perfectly forecast period, the cdf curve should look like ▨ . If it is closer to ▨ , the realisations were less volatile than forecast; if it is closer to ▨ , the realisations were more volatile than forecast.

Period

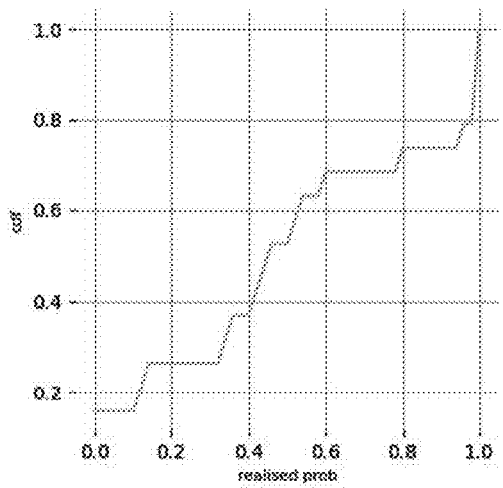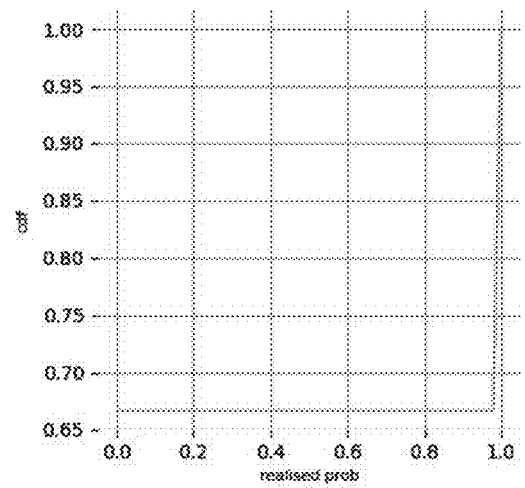
FIG. 12F

PLATFORM, METHOD, AND SYSTEM FOR A SEARCH ENGINE OF TIME SERIES DATA

CROSS-REFERENCE TO RELATED APPLICATIONS

This application claims benefit under 35 U.S.C. § 119(e) of U.S. Provisional Application having Ser. No. 62/988,389 filed Mar. 11, 2020, which is hereby incorporated by reference herein in its entirety.

FIELD

The subject disclosure relates to data processing, and more particularly, to a platform, method, and system for a search engine of time series data.

BACKGROUND

Online search engines are software systems generally used to retrieve data. Most commonly, as used today, a search engine retrieves online web pages relevant to a query subject. The results of a search query (sometimes colloquially referred to as "hits") may be listed in various orders depending on the underlying algorithm employed by the engine.

The information retrieved may be for example, a mix of links to web pages, images, videos, infographics, articles, research papers, and other types of files. Unlike web directories, which are maintained only by human editors, search engines may maintain real-time information by running an algorithm on a web crawler.

Online search engines generally retrieve their information by crawling from site to site. A script checks for a standard filename addressed to it (for example, "robots.txt"). The robots.txt file contains directives for search spiders, telling it which pages to crawl. After checking for robots.txt and either finding it or not, the spider sends certain information back to be indexed depending on many factors, such as the titles, page content, JavaScript, Cascading Style Sheets (CSS), headings, or its metadata in HTML meta tags.

In some search engines, the content of indexed sources determines how a query result may be listed. The nature of the underlying piece of data may have arbitrary relevance to the search query. There is generally only a loose association to the search query. In some cases, the retrieved results may be manipulated by content managers which understand how some search engine's retrieval algorithm operates. A web page for example, may be constructed with metadata in such a way that satisfies ranking criteria for a search engine to place it higher in a list than it otherwise would be for the actual underlying information related to the query subject.

As can be seen, current search engines provide only static or historical information which can be manipulated.

SUMMARY

In one aspect of the disclosure, a computer program product for an online search engine generating search query results is disclosed. The computer program product comprises a non-transitory computer readable storage medium having computer readable program code embodied therewith. The computer readable program code is configured, when executed by a processor, to: generate a user interface (UI) on a computing device with an electronic display; generate a search query field configured to receive a user's search query topic; retrieve from one or more online data sources, sets of data associated with the search query topic; assemble the retrieved sets of data into time series data related to the search query; determine, based on the time series data, a plurality of driving factors associated with the search query topic; and display the driving factors associated with the search query topic in the user interface.

In another aspect of the disclosure, a method of generating search query results and operating an online search engine is disclosed. The method comprises: generating a user interface (UI) on a computing device with an electronic display; generating a search query field configured to receive a user's search query topic; retrieving from one or more online data sources, sets of data associated with the search query topic; assembling the retrieved sets of data into time series data related to the search query; determining, based on the time series data, a plurality of driving factors associated with the search query topic; and displaying the driving factors associated with the search query topic in the user interface.

In still yet another aspect of the disclosure, an online host server is disclosed. The online host server comprises: a network connection; a memory storage device; and a processor coupled to the network connection and connected to the memory storage device. Computer executable instructions in the memory storage device configure the processor to: generate a user interface (UI) on a computing device with an electronic display; generate a search query field configured to receive a user's search query topic; retrieve from one or more online data sources, sets of data associated with the search query topic; assemble the retrieved sets of data into time series data related to the search query; determine, based on the time series data, a plurality of driving factors associated with the search query topic; and display the driving factors associated with the search query topic in the user interface.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

FIGS. 9A and 9B are screenshots of a UI dashboard showing a query search result for a search topic accompanied by a driving factors panel according to an exemplary embodiment.

FIGS. 10A-10F are screenshots of a UI dashboard for a predictions panel displaying predictions based on a 95% importance cutoff value according to an exemplary embodiment.

FIGS. 11A-11F are screenshots of a UI dashboard for a predictions panel displaying predictions based on a 99% importance cutoff value according to an exemplary embodiment.

FIGS. 12A-12F are screenshots of a UI dashboard for a predictions panel displaying predictions after user editing of the results based on a 99% importance cutoff value according to an exemplary embodiment.

DETAILED DESCRIPTION

Figure 1:
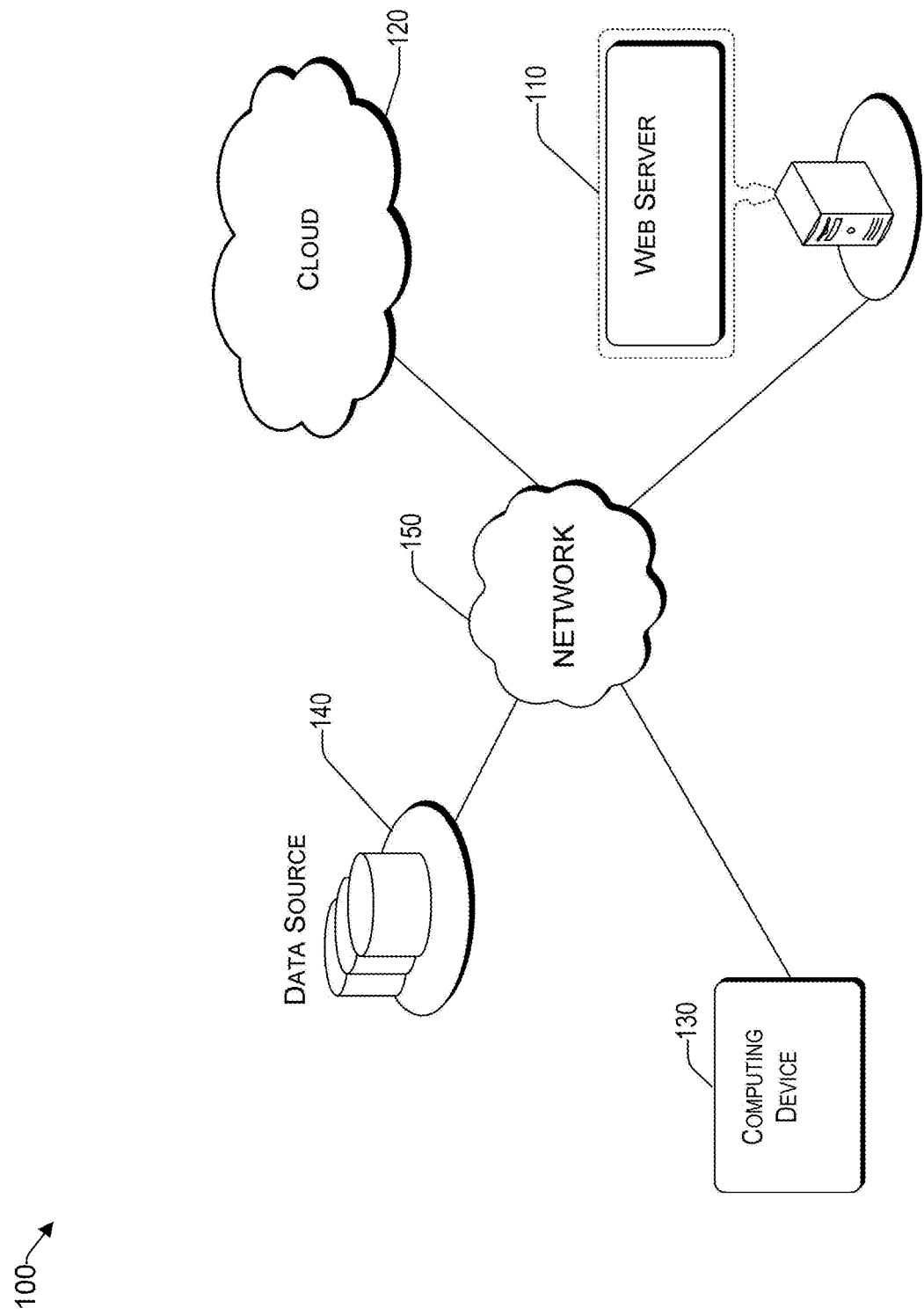
FIG. 1 is a block diagram of a system for generating predictive analysis of a search query using a time series based search for a subject in accordance with an aspect of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

Definitions

"Time series/Series": a sequence of data, each value in which sequence is associated with a timestamp for the time point of its measurement/observation.

"Dataset/Set of time series/Collection of time series/ Universe of time series": the collection of time series that an implementation of the platform may be pre-configured with.

"Search time series/Query time series/Target time series": the time series that the user searches for.

"Predictive factor/Driving factor": any time series of which up-to-date values have predictive power for the future values of the given "Query time series".

"Feature/Feature time series": any time series whose up-to-date values are used as input to the prediction model, which generates predictions as output.

In general, and referring to the Figures, embodiments provide a system and method for searching query subjects. The results of the search may provide factors that drove the search query subject. In addition, the data behind the driving factors may be used to generate predictions which may be used for a variety of applications.

In an exemplary embodiment, aspects of the subject technology may be used as an underlying structure for an online host platform. The platform provides a search engine which may use a time series of data relevant to a search query to generate relevant results. In some embodiments, the search result data may be used for predictions of events (and future events) related to the query. As will be appreciated, the underlying backend technology provides useful information for predictions of topics being searched via a front-end interface.

It will be appreciated that the subject technology differs from conventional search engines. The underlying process non-conventionally uses time series data to determine factors that drove a query subject. In addition, the process includes a non-conventional feature of predicting future events or status of the query subject. In an exemplary embodiment, a neural network model may use the driving factors as the dataset for predicting future events.

In the disclosure that follows, the steps in processes being described may sometimes be referred to as blocks or steps followed by enumeration. In some instances, the enumeration of a process step may be designated by a number within parentheses.

Referring now to the Figures, FIG. 1 shows a system embodiment in accordance with an exemplary embodiment. A system 100 generally includes a web server 110 which may host an online platform accessible to users through a network 150. The web server 110 may operate the backend processes of a search engine. In some embodiments, the web server 110 and/or the network 150 may reside within a cloud computing environment 120. Users may generally access the services available from the web server 110 by interfacing with their own computing device 130. In an exemplary use of the system 100, a user may access a software application within their computing device 130 which may include a user interface (UI) that accesses the search engine. The UI may include a query search entry field. Upon entry of the query subject, the UI may forward the query request through the network 150 to the web server 110. In response, the web server 110 may search through data sources 140 and retrieve data associated with the query subject.

In an exemplary embodiment, the web server 110 may analyze the retrieved data by filtering out irrelevant data. Relevant data may then be analyzed to determine its influence in driving the query subject. In an exemplary embodiment, the data set may use time series data to determine driving factors. In addition, predicted conditional distributions of future value of the query subject provided by the web server may be based on the driving factors influencing the query subject the most.

Figure 2:
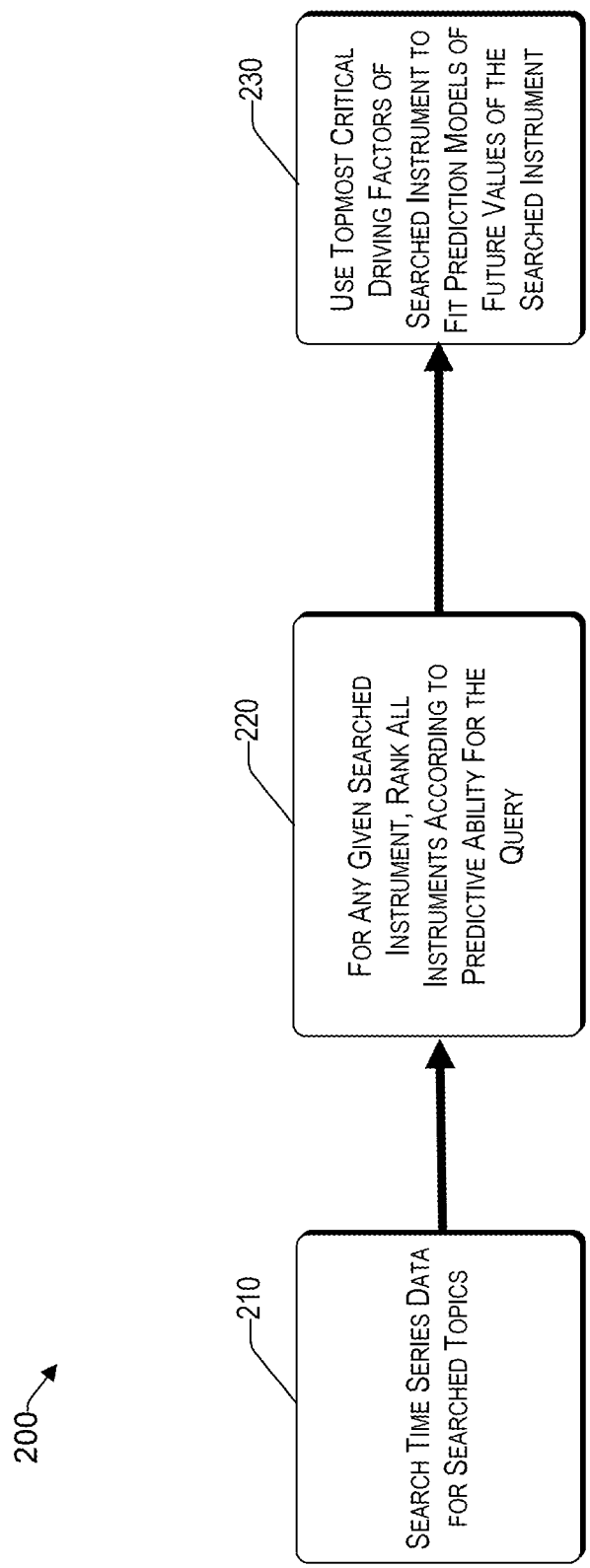
FIG. 2 is a flowchart of a process for predicting future values of a search subject in accordance with an aspect of the subject technology.

FIG. 2 shows a process 200 for predicting future values of a search subject according to an exemplary embodiment. Reference to elements in FIG. 1 may be described in some steps however, the process may operate independent of the devices in FIG. 1 in some embodiments. The process 200 may include searching 210 time series data for a search topic. The retrieved time series data may be ranked 220 according to its predictive ability for the search topic. For any target data series, determining the driving factors may involve re-training of the prediction model (described later) repetitively performed by a computing device (local to the online platform web server 110 or in the cloud 120), with connection to the data source(s) 140 (in-house or external, in the form of flat files as .csv, databases, or dynamic feed over network). For any target data series, once the topmost driving factors are identified, the prediction model may be fit using 230 that set of driving factors.

Figure 3:
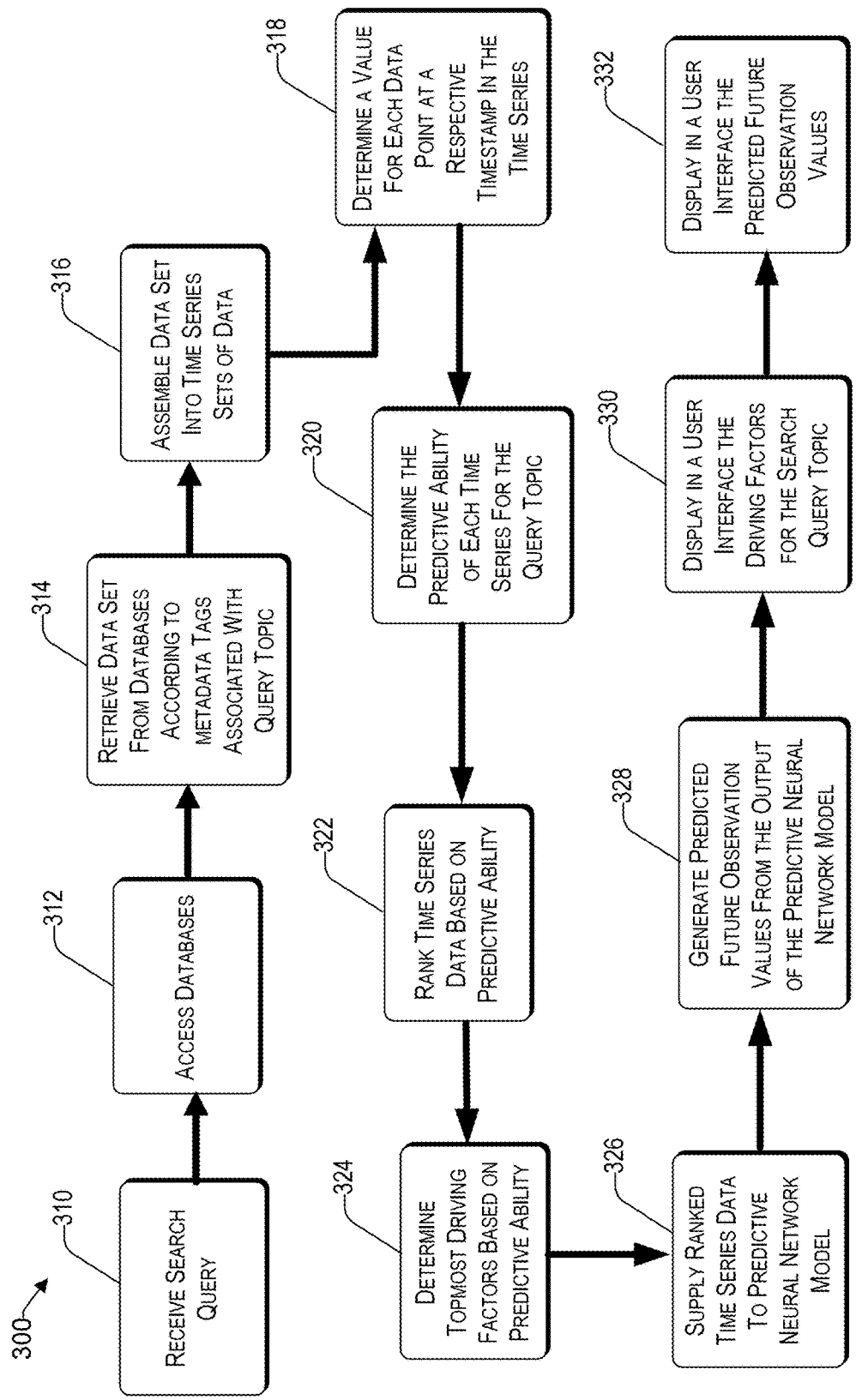
FIG. 3 is a flowchart of a process for generating search query results based on time series data in accordance with an aspect of the subject technology.

Referring now to FIG. 3, a process 300 for generating search query results based on time series data is shown according to an exemplary embodiment. The actions in the process may be performed by a computing processor resident in the web server according to a software application or by a local application on the end user computing device. Some of the actions related to model fitting and/or predictions may be performed by the server, client end device or by cloud computing resources. The process 300 may generate displayed results on a UI in response to a user entering a search query. The process 300 may begin when a search query is received 310. Receipt of the search query may trigger accessing 312 one or more databases. In some embodiments, the search engine module may be configured with metadata describing data sources, their formats, names, decimal digits, etc. and various scripts that download updates of search query related time series data from their respective sources. In some embodiments, specific databases may be searched (as opposed to a general web crawl) because they have specific data related to the query topic, which may be updated periodically. For example, the current value of a commodity or an index may require that one or more specific online database services be accessed. Data sets may be retrieved 314 according to metadata tags associated with the query topic. The retrieved data sets may be assembled 316 into time series data. Discussion of implementing time series data is described further below. Values for each data point may be determined 318 for each timestamp in the time series. The predictive ability of each time series for the query topic may be determined 320. Based on the predictive ability of a time series, the topmost driving factors of a query topic may be determined 324. An example of determining predictive factors (or capability) is discussed further below. In some embodiments, the ranked time series data may be supplied 326 to a predictive neural network model. The neural network model may be operated to generate 328 predicted conditional distribution for future values of the query topic. The driving factors based on the time series data for the query topic may be displayed 330 in the UI. In some embodiments, the predicted conditional distribution of future values may be displayed 332 in the UI.

In an exemplary application where the user wants to generate a forecast related to an economic event or topic, the user searches for arbitrary financial instruments/economic data series. The system may determine the driving factors underpinning query results. The driving factors of the queried instrument/data series may be displayed, ranked in descending order of importance. If the engine is able to identify the driving factors, the process(es) may make a prediction of the conditional distribution of the future value of the queried series, and may display as well the metrics of the goodness of fit of the predictions.

As will be discussed in more detail below, some embodiments include a Web-based UI, as well as programmatic API interface to display/export results for downstream use scenarios as automatic portfolio management, etc.

Time Series S

In the embodiments disclosed, any number of time series data may be used without departing from the scope of the subject technology. For sake of illustration, a time series S is defined with the observations of its values at chronologically increasing timestamps $t_1, \ldots, t_I$. For each timestamp $t_k$ we note the observed value $S_{t_k}$. S is the set of observations at all timestamps, $$S := \{S_{t_k} | k=1, \ldots, I\}. \quad \text{eq. 1:}$$

The intervals between the timestamps $t_1, \ldots, t_I$ may be non-uniform. The observed values could carry a unit, or be unit-less, for example, USD/share for a US stock price, but unit-less for a stock index. Moreover, for any given timestamp $t_k$, the observation $S_{t_k}$ may be missing, in which case one may fill in with not-a-number (NaN). Any two generic time series S, T may be indexed by a different set of timestamps.

Figure 4:
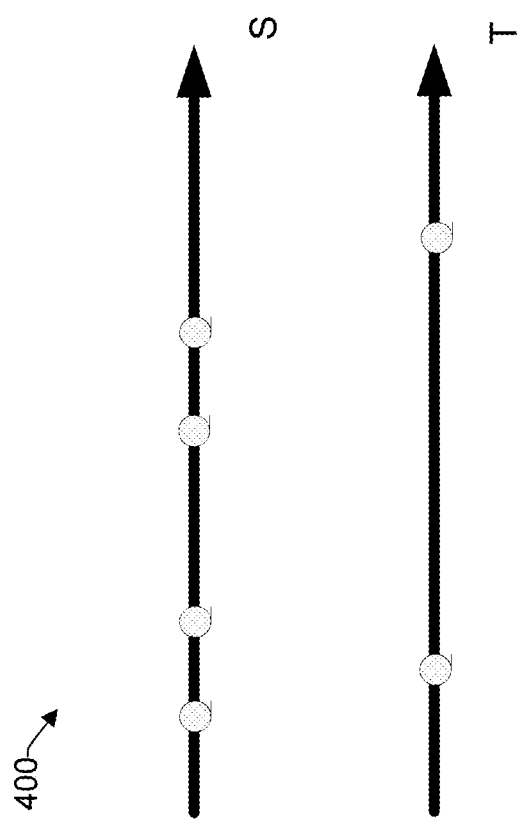
FIG. 4 is a schematic diagram of an example comparison of time series.

Referring now to FIG. 4, examples of series S and T are shown according to embodiments. The crosshatched-filled circles are timestamps of observations of its value at that timestamp. S is observed at different timestamps than T, and at higher frequency than T.

Predictive Factor (or Causal Factor in the Granger Causality Sense)

Given a time series X, which other series are predictive of it? This question is important when faced with a large collection of time series. To solve any practical problem posed on one series, it may be advantageous to reduce the scope down to a small set of series that are most predictive of the one in question.

For this goal, in an exemplary embodiment, the underlying process(es) may first compute the predictive ability of each series for a given query series, then rank them in descending order of the predictive ability for the given query series.

A prediction model may be formulated, which may be used persistently throughout the disclosure. Suppose the series of interest is denoted X. X may represent for example the time series data for a search query topic. For any timestamp $t_j$, $X_{t_j}$, the value of the series associated to time $t_j$, may be modeled as a random variable. The probabilistic distribution of $X_{t_j}$ may be modeled from the past values of a feature set of time series.

The prediction model could be formulated as: for any k=1, 2, . . . .

$$X_{t_k+p,\tau} = f(S_{t_1}, S_{t_2}, \ldots, S_{t_k}, \tau),$$

where $X_{t_j,\tau}$ denotes the τ-quantile of the probabilistic distribution of $X_{t_j}$, j=1, 2, . . . , τ is the probability level, $\tau \in (0,1)$;

S is the set of time series as features (for example, features related to a search query topic), whose observation at any timestamp could be a vector. For example, if the feature set contains series A and C, then $S_{t_k} = (A_{t_k}, C_{t_k})$ for any k=1, 2, . . . ;

p is a parameter denoting the forecast horizon, for example, $t_{k+p}$ could be 10-minutes ahead, one-day ahead, or one-quarter ahead relative to $t_k$ for any k=1, 2, . . . . As may be appreciated, the prediction pivots on inter-temporal causal relationship between the features and the response;

f is a certain transform function. There could be many possible choices for f, for example, random forest, neural network, etc. One particular neural network architecture will be discussed further later.

The prediction model prediction model presented here is essentially Quantile Regression adapted for time series. The Quantile Regression Loss may be minimized during training.

With the prediction model formulated, a single series A's predictive ability for query series X may be quantified with the help of a set of time series other than A, which may be a control set, according to an exemplary embodiment. Which features to include in the control set is rather flexible. For now, the calculation may be illustrated with two series B and C for the control set.

The prediction model may be fitted twice:
For example, a first fit may use feature set S={A, B, C} to predict future values of X;
A second fit may use feature set S={B, C} to predict future values of X.

The loss metric may be measured from the two trainings. The difference of the two metrics is the predictive ability of A for X. As can be seen from the calculation procedure, the notion is intrinsically relative and incremental, and in some literature, it is called partial predictive ability for this reason. It should also be understood that the two sets described above were examples only to illustrate one method of determining a loss metric and generally, the predictive ability value of a time series for a given search query topic.

Lastly, given a collection of time series, any random combination of them is a valid control set. One may run through every possible control set, average the results for every control set to produce the final measure of the predictive ability of series A for query series X, for the given collection of time series. Calculated in this ideal way, it is also called Shapley Value in literature.

Practically speaking however, the number of possible control sets is exponential with respect to the total number of time series in the collection. It may be computationally prohibitive to attempt to calculate all iterations, although possible depending on the number of time series. In the next section, an efficient exemplary way to compute the approximate Shapley Value is illustrated.

Ranking of all Series in Terms of their Capability to Predict Future Values of Series X Suppose the query series is X. Apart from that, the given collection of time series includes A, B, C, D, E, F. In order to measure the predictive ability of any of the six for X, the process (or engine) may draw a large yet limited number of random combinations of features. For example, one has drawn 4 combinations:
[A, B, D] (1st experiment)
[A, D, E] (2nd experiment)
[B, E] (3rd experiment)
[B, C, D, E] (4th experiment)

For each experiment the prediction model may be trained with the drawn features. Each training may yield a minimized loss metric, denoted by $\phi_1$, $\phi_2$, $\phi_3$, $\phi_4$.

In order to measure the predictive ability of A for X, the group of experiments including A as feature (Experiment 1, 2) may be contrasted with the group of experiments excluding A as a feature (Experiments 3, 4), and measure by how much the loss metric improves, on average. The difference is $\frac{1}{2}(\phi_1+\phi_2)-\frac{1}{2}(\phi_3+\phi_4)$.

Alternatively, the process may perform a statistical test, on whether it is more likely that a random element from the set $\{\phi_1, \phi_2\}$ is less than a random element from the set $\{\phi_3, \phi_4\}$. This will produce a p-value that is always bound between [0,1], as opposed to the arithmetic difference in the previous paragraph, that is unbounded in principle.

In order to measure the predictive ability of B for X, the process may reuse the optimized (minimized) loss metrics from the four experiments. Again, the group of experiments including B as feature (Experiment 1, 3, 4) may be contrasted with the group of experiments excluding B as feature (Experiment 2), and measure by how much the loss metric improves, on average. This difference is $\frac{1}{3}(\phi_1+\phi_3+\phi_4)-\phi_2$.

Alternatively, the process may perform a statistical test, on whether it is more likely that a random element from the set $\{\phi_1, \phi_3, \phi_4\}$ is less than a random element from the set $\{\phi_2\}$. This produces again a p-value that is always bound between [0,1].

By reusing the same set of experiments and their optimized loss metrics, the process provides a much more efficient way to compute an approximate Shapley Value that characterizes the predictive ability of each feature series for X, either in the form of an arithmetic difference, or in the form of the p-value from a statistical test.

The p-values, as they are always bounded between [0,1], lend themselves to ranking the feature series. The process may find the maximum p-value, then determine a lower threshold (say, 5% lower than the maximum p-value), and take all feature series with p-values within that band for training of final prediction models.

Prediction of Conditional Distribution of Future Values of the Series X

For a given query series X and forecast horizon p, once the most important predictive factors are identified following the above process(es), the processes may train final prediction model(s) using these top features, and begin to make prediction of conditional distribution of $X_{t_{k+p}}$ out-of-sample, based on all available information of the predictive factors, up to time $t_k$, where $t_k$ is any timestamp during the out-of-sample period.

Precisely, with final trained model(s) and all input information up to $t_k$, the process may increase the probability level $\tau$ from 0 to 1 and feed it to the trained model(s), which will output predicted $\tau$-quantiles of probabilistic distribution of $X_{t_{k+p}}$. The predicted quantiles together depict the "entire" conditional distribution of $X_{t_{k+p}}$.

Evaluating the Goodness of Predicted Conditional Distributions

How to check the quality of predictions during the out-of-sample period? For a given $t_k$ on which the prediction is calculated for the conditional distribution at target time $t_{k+p}$, from the predicted conditional distribution of $X_{t_{k+p}}$, one deduces the respective cumulative density function, denoted by $\hat{F}_{t_{k+p}}(\cdot)$, for the given calculation time $t_k$ and forecast/target time $t_{k+p}$.

For the given calculation $t_k$ and forecast/target time $t_{k+p}$, let us denote the actual value which can only be observed later at time $t_{k+p}$, by $x_{t_{k+p}}$. This observed value is a scalar value. When we evaluate $\hat{F}_{t_{k+p}}(\cdot)$ on the actual value $x_{t_{k+p}}$, it gives a scalar value $\hat{F}_{t_{k+p}}(x_{t_{k+p}})$, for the given $t_k$ and $t_{k+p}$.

If the predictions of the conditional distribution are always made well, when we run $t_k$ over the prediction/out-of-sample period, $\{\hat{F}_{t_{k+p}}(x_{t_{k+p}})\}$ would follow the Uniform Distribution between 0 and 1, and they would all be independent for different k. Using this property, one could perform a test of goodness of fit of the observed $\hat{F}_{t_{k+p}}(x_{t_{k+p}})$ over the out-of-sample period against the Uniform Distribution between 0 and 1, and report the associated p-value.

As long as the p-value from the above test doesn't drop below a certain significant level (for example, 0.05, 0.01, etc.), it is statistically acceptable that the end user uses the predictions made by the system to perform downstream tasks. When it does drop below a certain pre-set significant level, the end user may be alerted, may check about possible cause(s) and consider whether he wants to continue using the prediction results for downstream tasks.

A Neural Network Architecture for the Prediction Model

Figure 5:
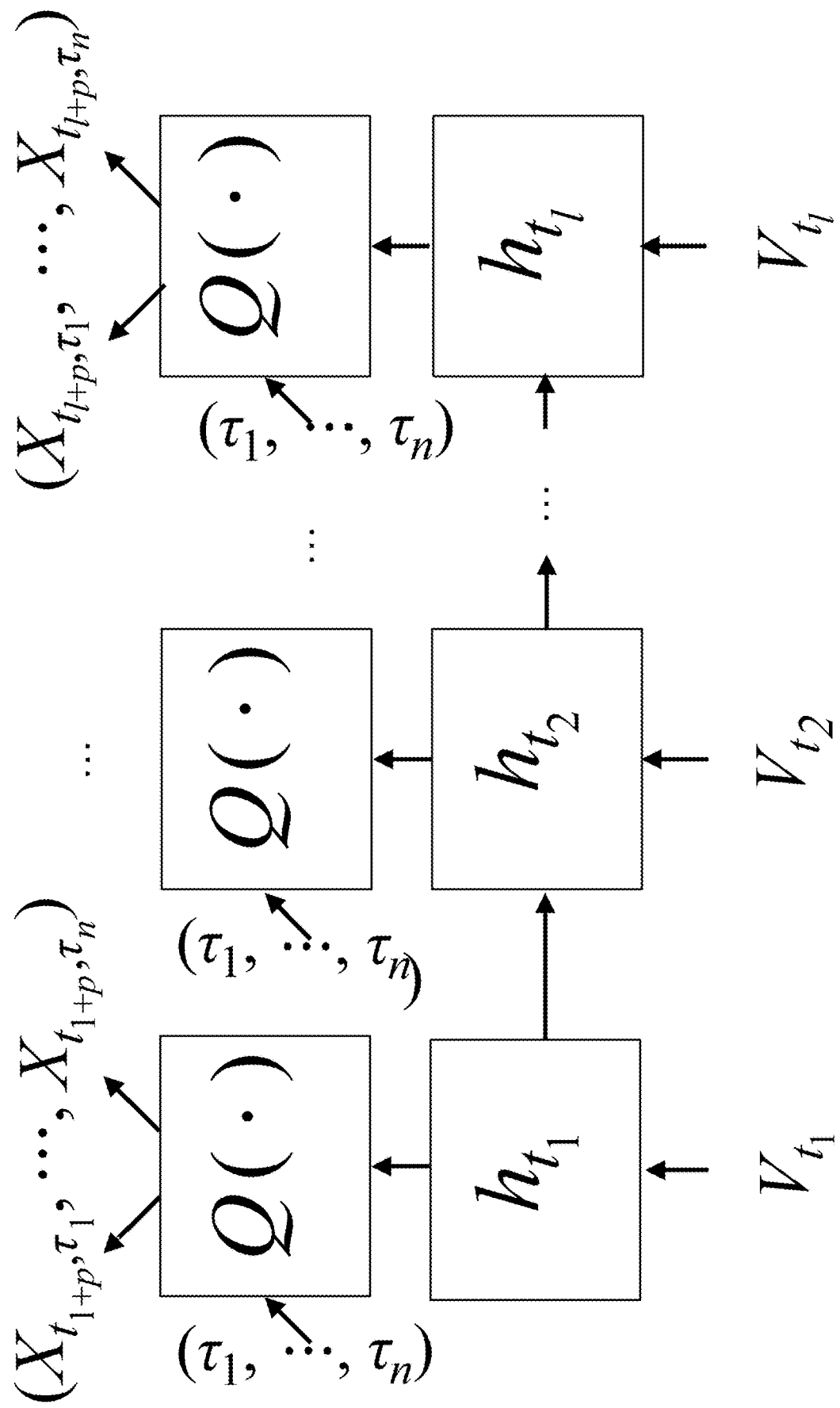
FIG. 5 is a block diagram of an architecture for a neural network model in accordance with an exemplary embodiment.

Out of many possible choices for the model architecture a particular implementation is shown in FIG. 5 as an exemplary embodiment.

There is a recurrent layer that updates the internal state, $h_{t_i}$, i=1, 2, . . . , in response to its previous state $h_{t_{i-1}}$ and the vector of values $V_{t_i}$ of input features observed at time $t_i$.

The input features' values $V_{t_i}$, i=1, 2, . . . to the recurrent layer are all numerical values. If any series in the raw input is text, on could first apply a Distributional Modeling Approach (for example, word2vec) to map the text to numerical vectors, appropriately timestamped with the observation times, and then feed the converted numerical vectors as input to the recurrent layer.

A non-linear transform model $Q(\cdot)$ takes as input $h_{t_i}$, i=1, 2, . . . and a vector of probability levels $(\tau_1, \ldots, \tau_n)$ to output a vector of predicted quantiles $(\hat{X}_{t_{i+p},\tau_1}, \ldots, \hat{X}_{t_{i+p},\tau_n})$ for the given timestamp index i and forecast horizon p, where $\hat{X}_{t_{i+p},\tau_m}$ is the predicted $\tau_m$-quantile of probabilistic distribution of $X_{t_{i+p}}$, m=1, . . . , n.

A novelty is that in Stochastic Gradient Descent (SGD) training, from training batch to training batch, the probability level vector $(\tau_1, \ldots, \tau_n)$ could be different as it is one input to $Q(\cdot)$ as well. At each batch, we could feed a new randomly drawn length-n vector in (0,1) simplex for $(\tau_1, \ldots, \tau_n)$. This flexibility in design tends to encourage robust result especially on practical time series.

For one training batch, to compute the loss metric, we start from the logarithm of Quantile Regression Loss for each single probability level $\tau_m$, m=1, . . . n, then average over all $\tau_m$ for the final figure.

While the above has been described in the context of neural network model, it will be understood that the choice of model for the prediction process may use other model types (for example, Trees, Random Forest, and other non-linear models) without departing from the scope of the subject disclosure.

A Search Engine of Time Series, and Specifically at this Stage, Driving Factor Analysis and Future Observation Prediction Using the Above Technology on Financial and Macroeconomic Time Series.

While the processes described have been in the context of financial and macroeconomic time series applications, it should be appreciated that the backend engine may be applied to virtually any other context which may be of interest to the user. For example, the processes may be applied to agricultural and meteorological time series as well.

Figure 6:
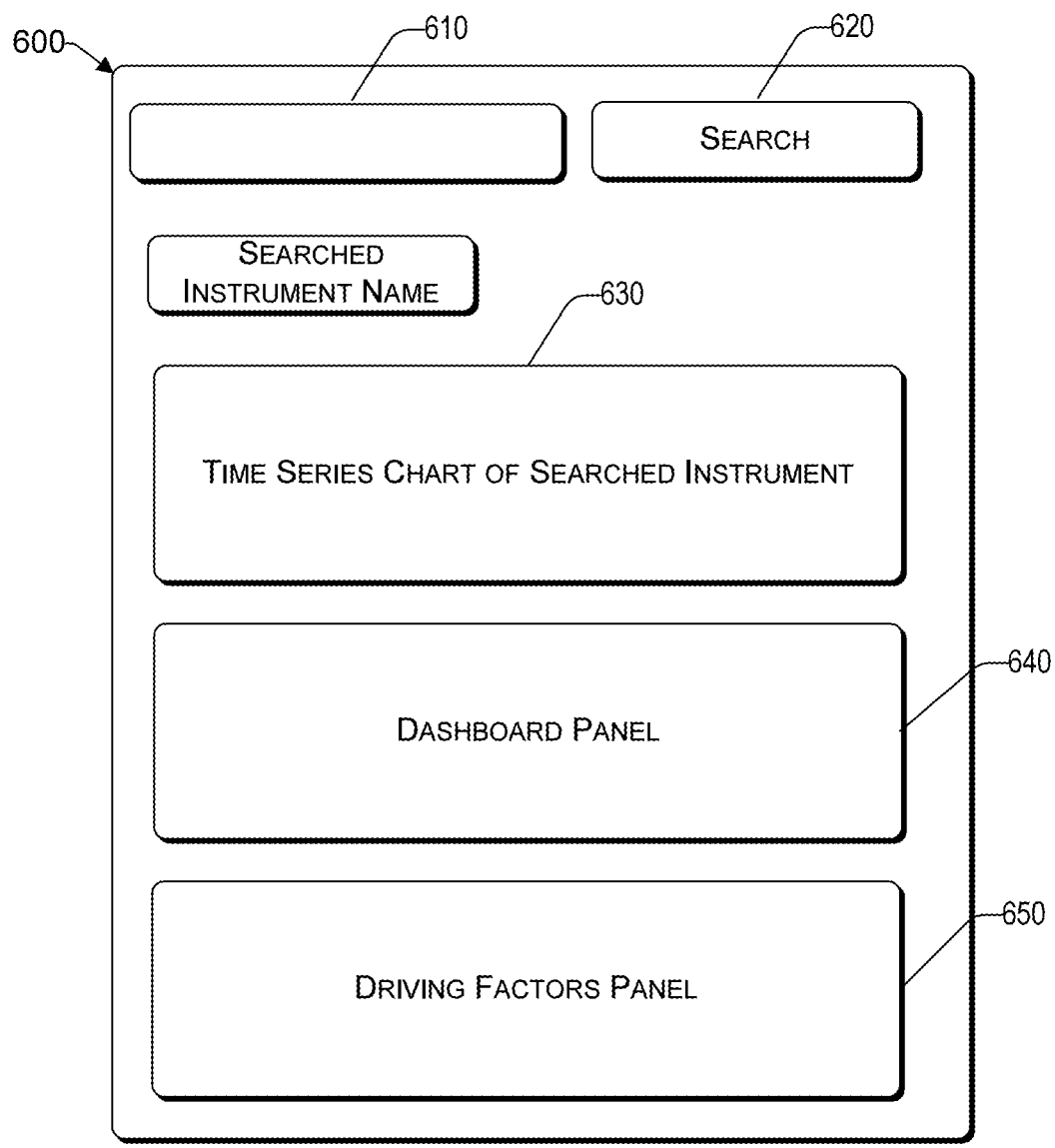
FIG. 6 is a screenshot of a user interface (UI) for a search engine in accordance with embodiments of the subject technology.

Referring now to FIG. 6, a user interface 600 is shown according to an exemplary embodiment. The frontend UI 600 may display time series data and related results, the values of which may be in numerical figures for some embodiments. The User Interface 600 may be configured for the user to input queries and displays information regarding the time series and driving factors. The UI 600 may include a query entry field 610 for receiving a search query topic. In some embodiments, the UI 600 may include a search button 620 which triggers the search for the query topic. The results generated by the search query may be displayed in the other panels present in the UI 600.

In some embodiments, the UI 600 may include a panel 630 which displays a time series chart of the query topic (searched instrument). The time series panel may display a historical chart, followed by a dashboard of information and list of predictive factors, as evaluated and ranked by the system in terms of their predictive ability for the query time series. See also FIGS. 9A-9B, 10A-10F, 11A-11F, and 12A-12F.

Figure 7A:
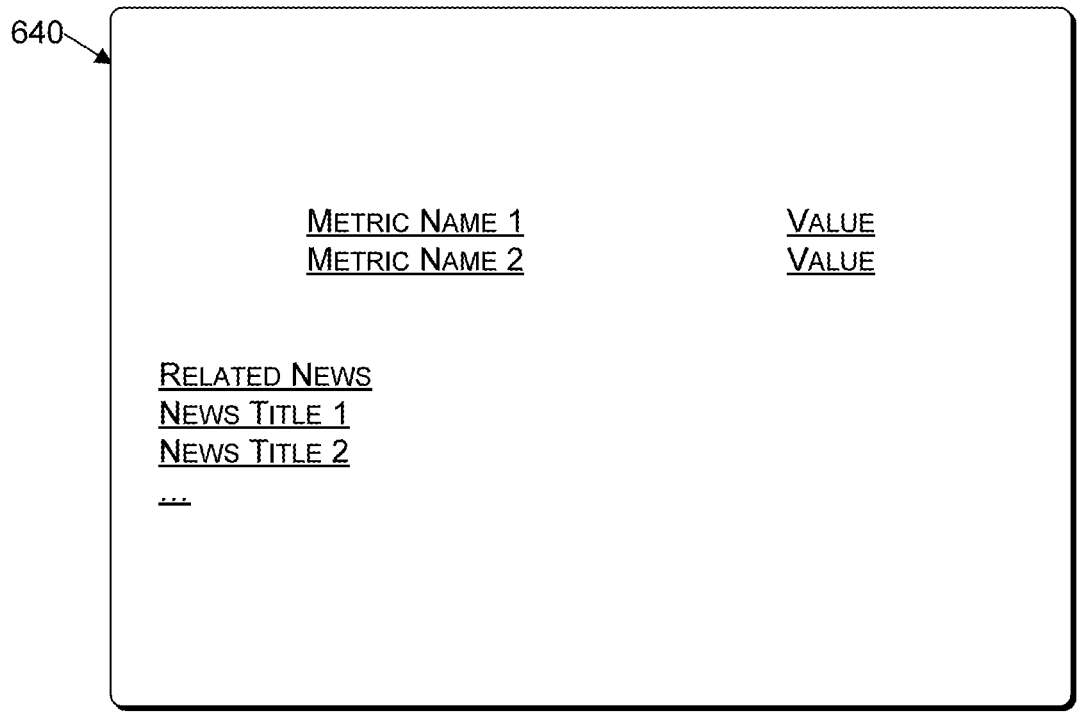
FIG. 7A is an enlarged view of a dashboard panel of the UI of FIG. 6 in accordance with an embodiment of the subject technology.

A dashboard panel 640 (FIG. 7A) in the UI 600 may display metrics, values for each metric and related news associated with the query topic. The dashboard panel 640 may display for example, information related to the user's current and historical searches. See also FIGS. 9A and 9B.

Figure 7B:
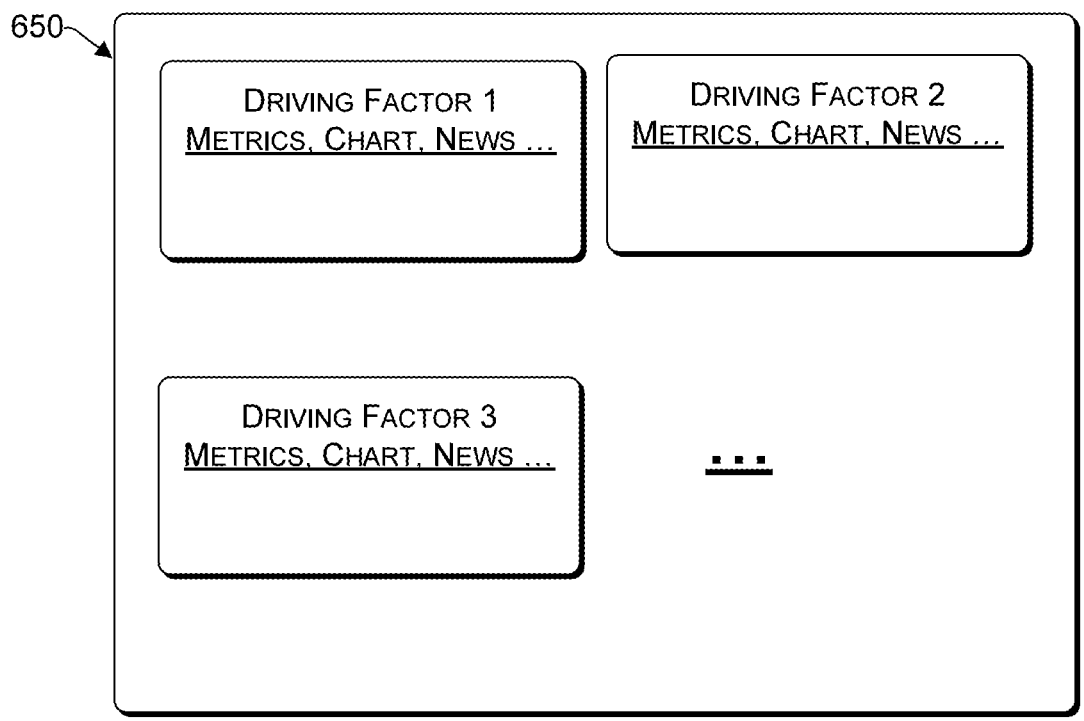
FIG. 7B is an enlarged view of a driving factors panel of the UI of FIG. 6 in accordance with an embodiment of the subject technology.

A driving factors panel 650 (FIG. 7B) lists the predictive factors, ranked in descending order of their predictive ability for the future value of the query time series, given a specific forecast horizon. The predictive ability of each factor, as evaluated per the section "Ranking of all series in terms of their capability to predict future values of series X" is given both in form of the arithmetic difference ("Shapley Value" in screenshot) and p-value of a statistical test on identical distribution ("Importance" in screenshot). FIG. 9B shows an example driving factors panel output according to an exemplary embodiment.

Figure 8:
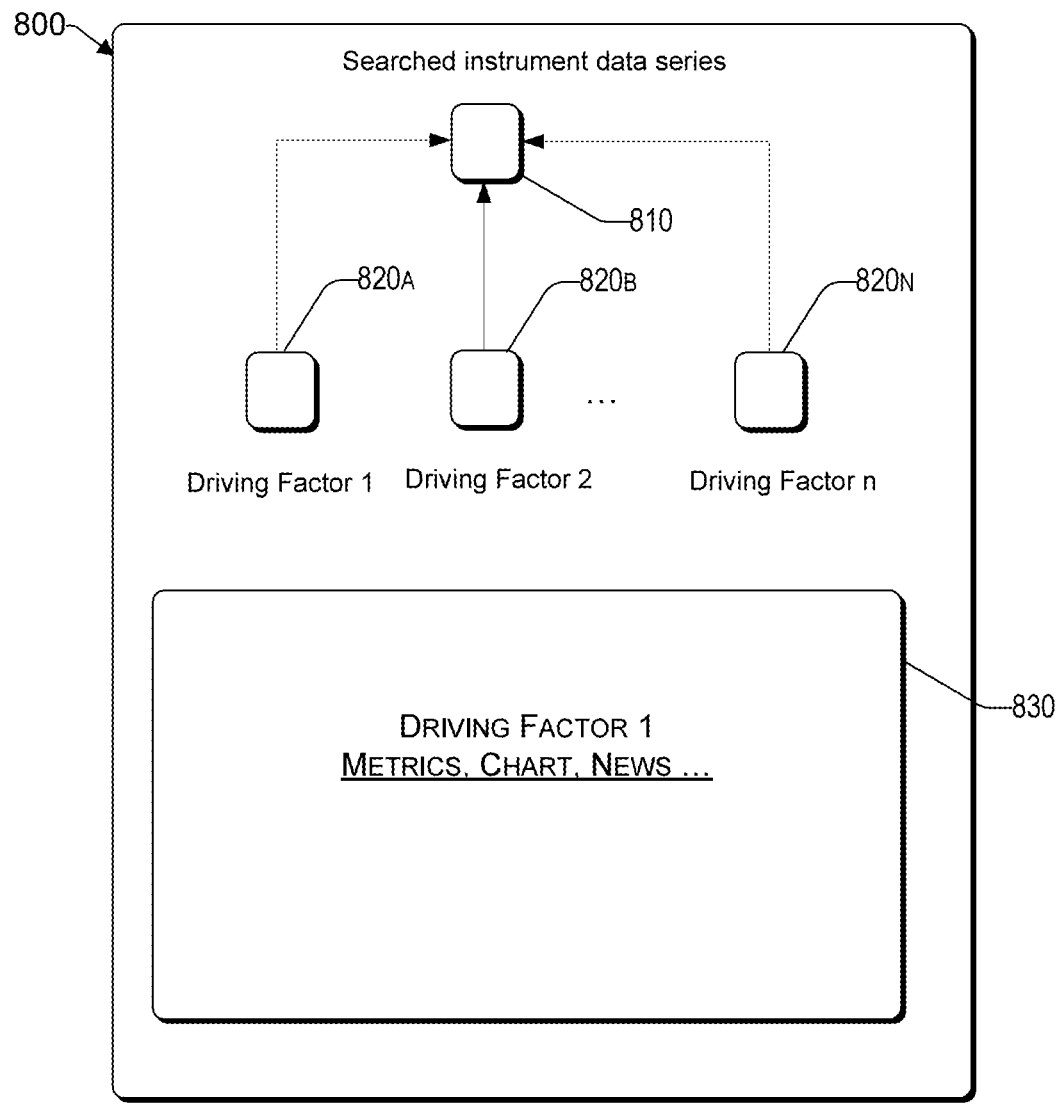
FIG. 8 is an example of a driving factors panel of the UI in accordance with another embodiment of the subject technology.
Figure 9A:
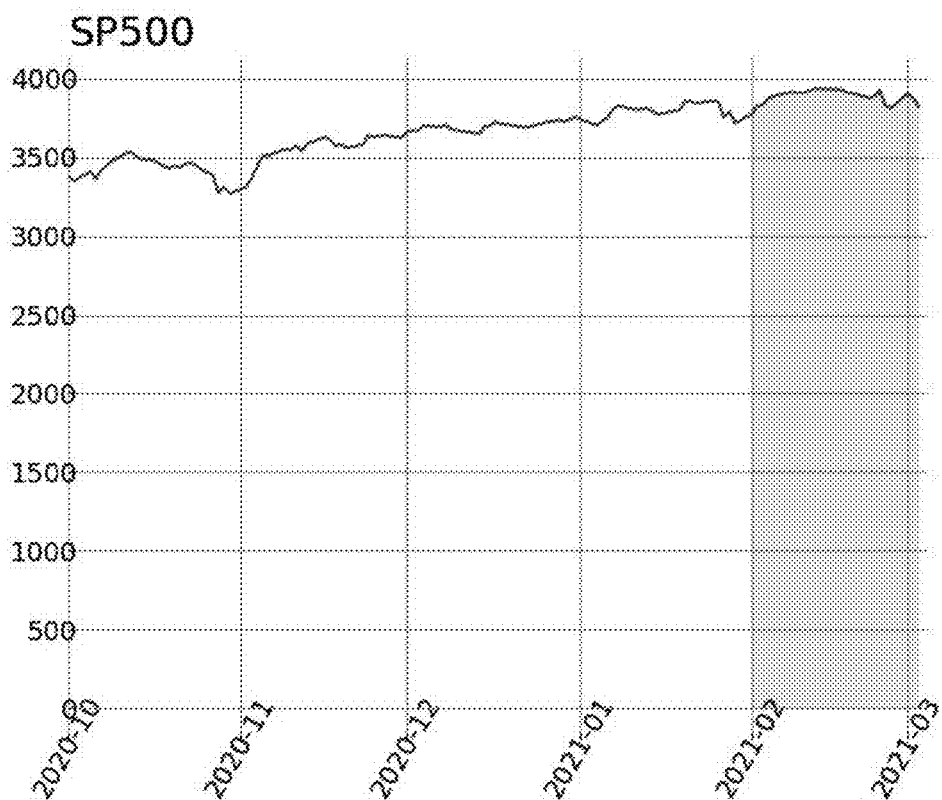

Referring now to FIG. 8, on a graphically high-performing device used by the end user, instead of being displayed as a mainly text page (for example, in some embodiments UI 600 may be mostly text), a UI 800 may display a network of driving factors pointing to the searched instrument (query target) data series 810 drawn on a canvas. When the user clicks on one of the nodes (820$_A$, 820$_B$, . . . 820$_N$) (which may be for example, a predictive factor, or query time series), relevant information about it is displayed in a pop-up window 830, which may include metrics, a chart(s), news, etc. that the user may study to better understand the underlying relevance of the selected driving factor to the queried searched instrument.

Figure 10A:
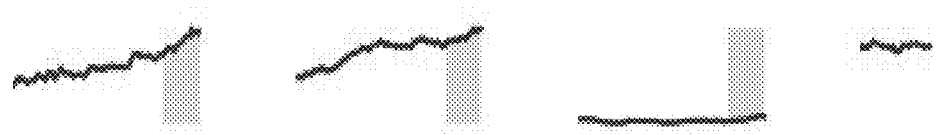
Figure 10B:
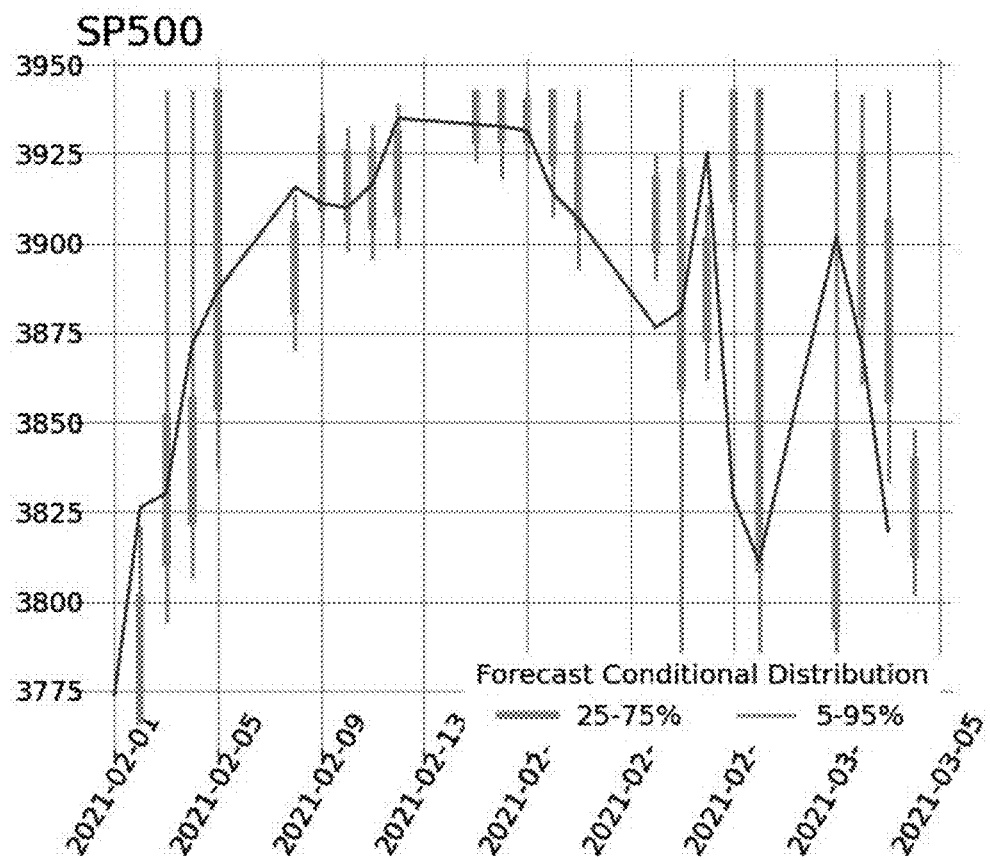
Figure 11A:
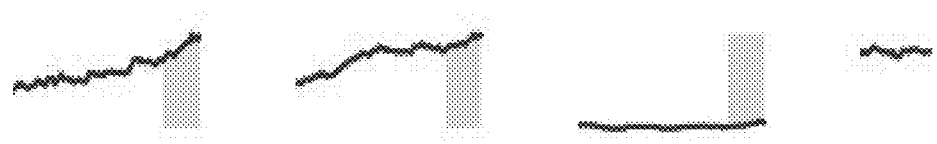
Figure 11B:
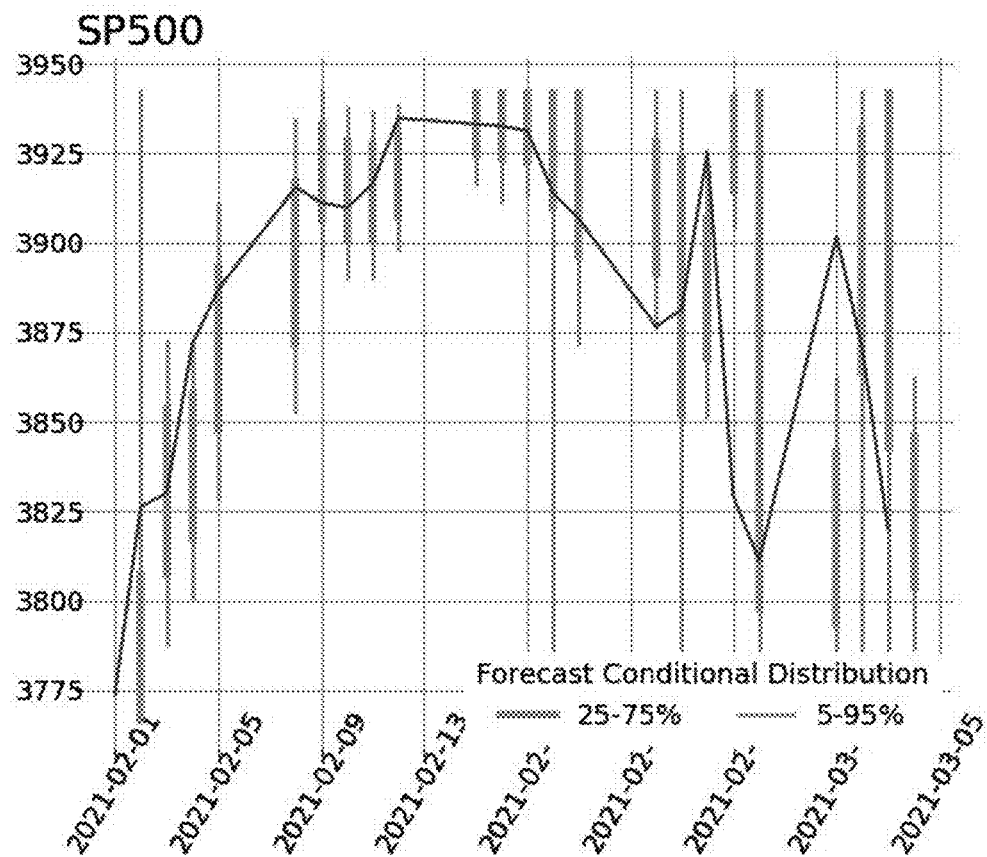
Figure 12A:
Figure 12B:
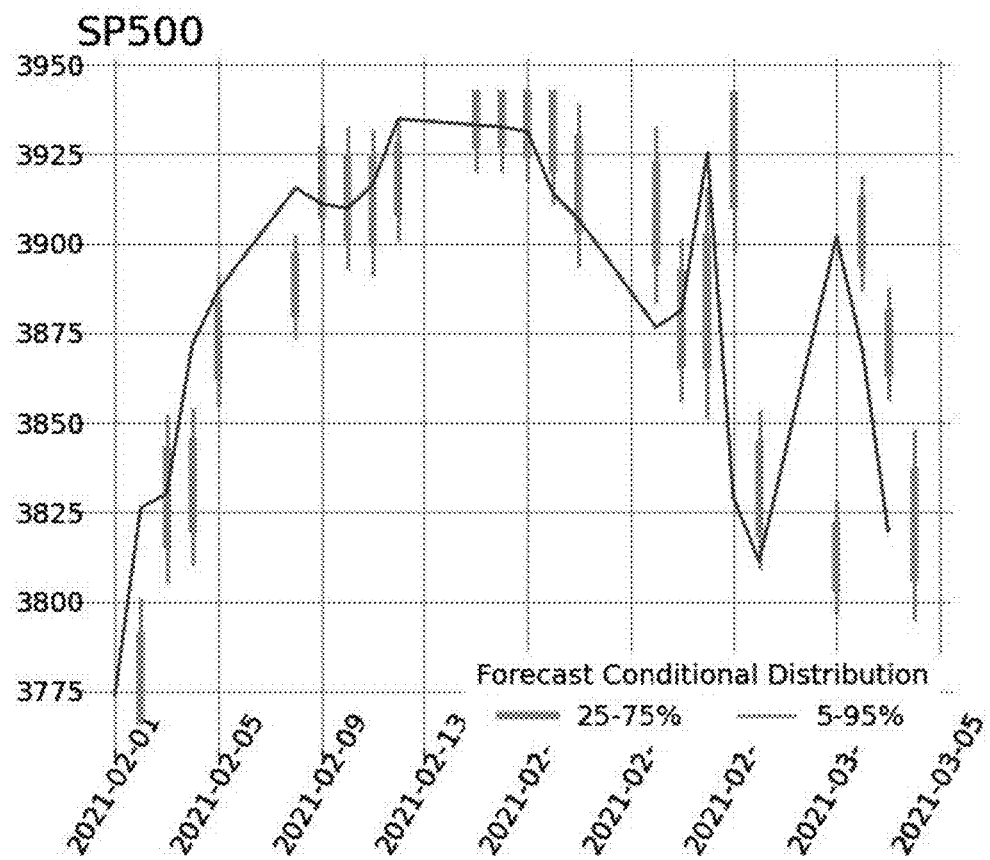
Figure 12E:
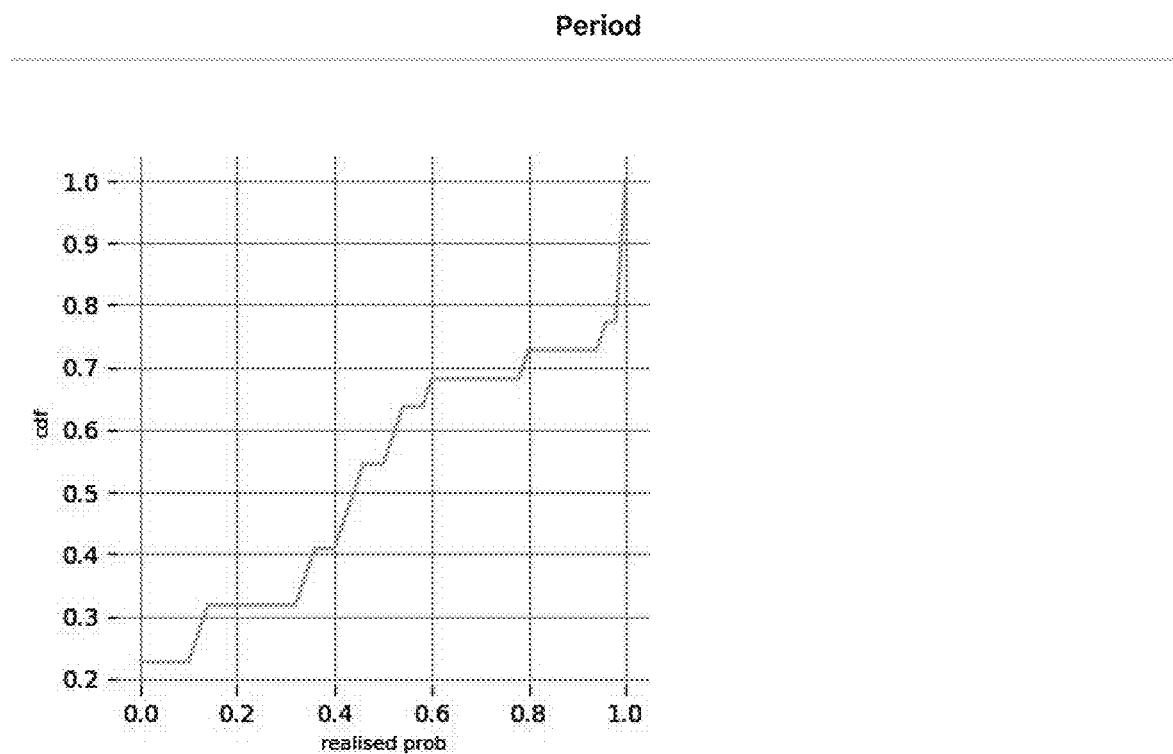

Referring to FIGS. 10A, 11A, and 12A, in a prediction UI, users may first choose the forecast horizon, then may set a cut-off level for the importance (p-values) of factors and pre-load only the factors with a p-value higher than the threshold, and use them as features to train the prediction model.

Once trained with selected predictive factors as features, the prediction model may run over out-of-sample period making predictions of conditional distributions of the value of the query time series. Such predictions may be plotted on the UI. See for example, FIGS. 10B, 11B, and 12B. The predicted conditional distribution for a given forecast/target time may be plotted in the form of a graded error bar (multiple error bars superimposed one on another for the same timestamp; for example, one for 5-95% forecast percentiles, a second for 15-85% forecast percentiles, a third for 25-75% forecast percentiles, all for the same forecast/target timestamp.)

When predictions are being made over the out-of-sample period, the goodness of those predictions may be evaluated as per the procedure laid out in the section "Evaluating the Goodness of Predicted Conditional Distributions". The p-value from the statistical tests may be displayed on the UI page. Alternatively, in order to check whether the empirical quantity $\{\hat{F}_{t_{k+p}}(x_{t_{k+p}})\}$ follow the Uniform Distribution between [0, 1], the UI would plot the cumulative density function of such empirical quantity, to be compared visually against that of the Uniform Distribution between [0, 1], which is precisely cdf(x)=x, x∈[0,1]. See for example, FIGS. 10E-10F, 11D-11F, and 12D-12F. The UI may include a graphical plot for the goodness of forecast and graphical explanation describing how to interpret the plot.

Notwithstanding the default behavior of selecting the topmost predictive driving factors for the query time series, users are free to edit any predictive factor, deleting, adding, or changing to a new one according to his experience, intuition, and as will be appreciated, re-train the prediction model with specified predictive factors and observe how predictions would change based on the edited information. For example, in FIG. 12A, the display shows the result of user editing of the data in FIG. 11A when one first pre-loads those driving factors with importance p-value of at least 0.99 then clicks on the name of each instrument, deletes three of them, and modifies the remaining one to the 3-Month Interest Rate on USD, and clicks on the selectable feature "Update Predictions" (shown in FIG. 11A).

Some embodiments may consider text data such as news articles for the results. The text found as results of a search query may be mapped into numerical vectors and thus handled uniformly along with the time series of numerical values (for example, today's Close Price of the S&P 500 Index) in terms of identifying critical driving factors and making conditional prediction.

In one example, a financial and economic time series can be broadly the time series of value of a portfolio (a combination) of financial instruments, as long as the portfolio is defined and the data series of its value is computed from those of its constituents. In one aspect, a time series may not be readily read from a financial exchange or released by the authority. However, some embodiments may perform a linear combination (multiplication with a coefficient then addition) of those to "manufacture" a new one. In this sense it is a "composite" or "synthetic" series. The engine would perform to the same effect even on these "composite" or "synthetic" series: one could query for a composite series, or, a composite series could appear in the list of driving factors for a certain query of normal/composite series.

The following is an example of results generated by the methods and system of the subject technology. The data universe was confined to about the 90 most important financial/macroeconomic series from the Federal Reserve Economic Database (FRED) data from the St Louis database:

The target series is the Nasdaq Composite Index. The forecast horizon is next-day. Discussing the results around the Financial Crisis 2007-2008, the system may generate the following information after searching the data source for, for example, daily index values:

Based on 4 years of data up to 2007Q2, the topmost driving factors found by the system are:
  the VIX Volatility Index
  the Russell 2000 Volatility Index, and
  the US Current Account This information would be displayed in the driving factors panel of the UI (for example, in FIG. 5). So, the subject of the query was driven by large-cap and small-cap stock volatility indices and trade. As will be appreciated, to the user, this is valuable information that may be used to make decisions related to the queried subject.

Under a different search criteria, based on 4 years' of data up to 2007Q3, the topmost driving factors are:
  VIX Volatility Index
  Russell 2000 Volatility Index
  DJIA Volatility Index
  10 y-2 y US Treasury Interest Rate Spread
  Baa US Corporate 10-yr Interest Rate
  USDGBP exchange rate Note the 10 y-2 y Interest Rate Spread figured in the list. Long predating the crisis, people noticed the inversion of the spread (normally longer-term interest rate was higher than shorter-term one, but in the years leading up to the crisis the 10 yr interest rate was below the 2 yr interest rate) but were largely wondering what that signifies. Another sensitive predictor would have been USDGBP.

Knowing in hindsight that the crash will come in 2007Q4, the system results may be evaluated to check for accuracy of the results. Based on 4 years' of data up to 2008Q1, the topmost driving factors displayed are:
  VIX Volatility Index
  DJIA Volatility Index
  Nikkei 225 Index
  Euro Area Financial Account The crash started from 2007Q4. It went international, bringing down Japan and the European Area, which is confirmed by the results and historical records.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Reference to a computer system or server may be described in the general context of computer system executable instructions, such as program modules, being executed by a computer system (described for example, below). In some embodiments, the computer system/server may be a cloud computing node connected to a cloud computing network (not shown). The computer system/server may be practiced in distributed cloud computing environments where tasks are performed by remote processing devices that are linked through a communications network. In a distributed cloud computing environment, program modules may be located in both local and remote computer system storage media including memory storage devices.

Figure 13:
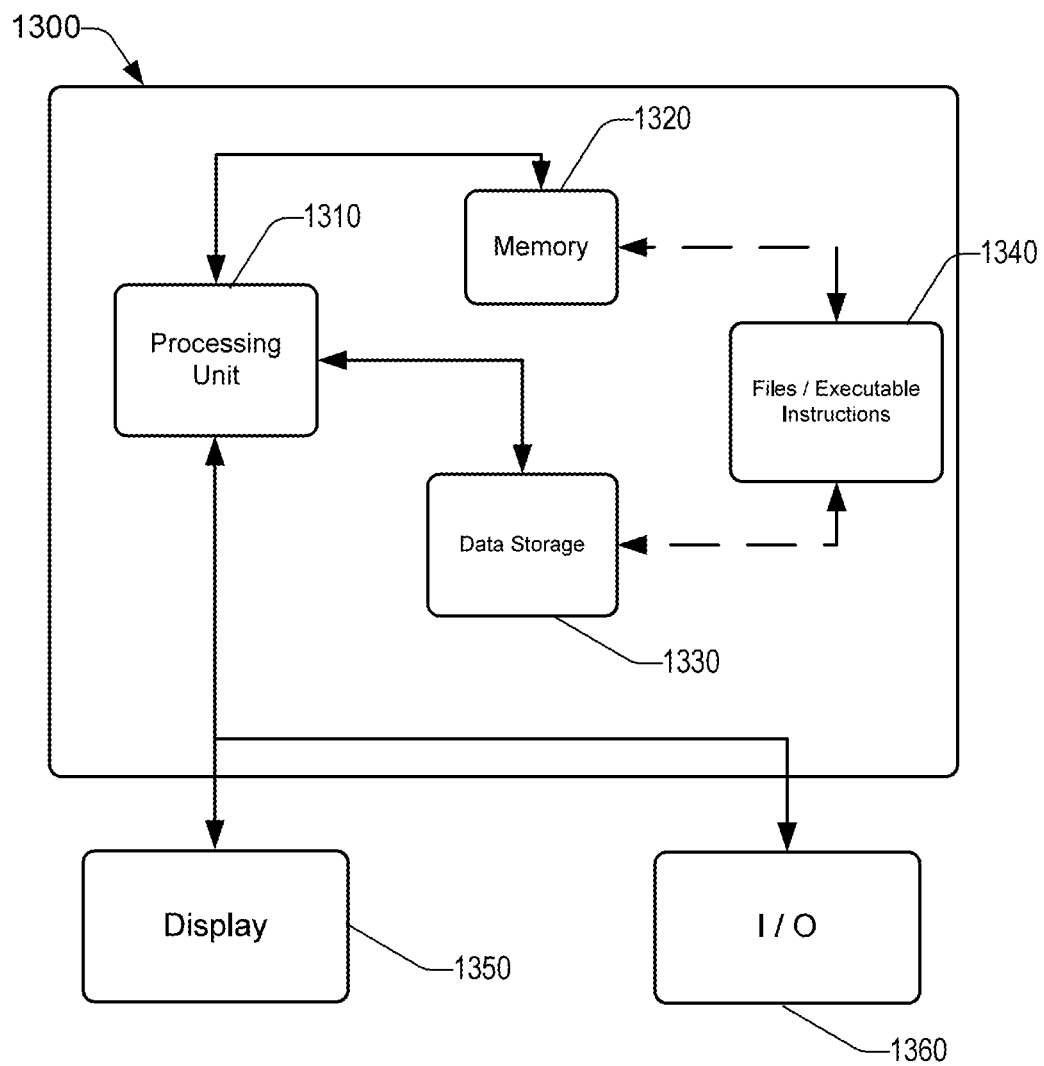
FIG. 13 is a block diagram of a computing device in accordance with embodiments of the subject technology.

Referring now to FIG. 13, a general computing device 1300 is shown according to an exemplary embodiment. It will be understood that a "computing device" may serve different roles depending on the need in the system or depending on the step being performed in a process. For example, in the role of a web server, a host server, or an online platform server, a computing device may implement for example the functions related to backend process (for example, those described with respect to FIGS. 2 and 3 and throughout). In the aforementioned roles, the computing device may also coordinate client accounts and provide the output generated by the backend for display on frontend interfaces of client computing devices (for example, those shown as the computing device 130 in FIG. 1). In another role, the computing device may be a repository of data connected via a network, from which the backend processing computing device(s) retrieve their data. In the role of a user device, the computing device 1300 is generally not a server but may instead be desktop computers, tablet or laptop computers, all-in-one computer stations, a mobile computing device (for example, a smart phone, smart wearable devices (glasses, jewelry, watches, ear wear, etc.), or programmable electronics. As will be understood, the user device may generally provide frontend aspects of the system. In some embodiments however, the frontend computing device may perform one or more of the backend steps where possible.

The components of the tablet or laptop computers may include, but are not limited to, one or more processors or processing units 1310, a system memory 1320, data storage 1330, a computer program product 1340 having a set of program modules including files and executable instructions, and a bus system that couples various system components including the system memory 1320 to the processor(s) 1310. The memory storage 1320 may store for example, archived data related to historical searches and stored driving factors or predictive values.

The computing device 1300 may be described in the general context of computer system executable instructions, such as the program modules which represent a software embodiment of the system and processes described generally above with respect to FIGS. 2 and 3. The program modules generally carry out the functions and/or methodologies of embodiments as described above. The computing device 1300 may typically include a variety of computer system readable media. Such media could be chosen from any available media that is accessible by the computing device 1300, including non-transitory, volatile and non-volatile media, removable and non-removable media for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing. The system memory 1320 could include one or more computer system readable media in the form of volatile memory, such as a random-access memory (RAM) and/or a cache memory. By way of example only, the data storage system 1330 may read from and write to a non-removable, non-volatile magnetic media device. The system memory 1320 may include at least one program product 1340 having a set of program modules that are configured to carry out the functions of embodiments of the invention in the form of computer executable instructions. The program product/utility 1340 may be stored in the system memory 1320 by way of example, and not limitation, one or more application programs, other program modules, and program data. Some embodiments may generate an electronic user interface (viewable and controllable from the display unit 1350) that may allow the user to enter search queries and select or manipulate the timer series, driving factor or predictive value data.

The computing device 1300 may communicate with one or more external devices including for example, a peripheral form of the electronic display 1350 which may in some embodiments be configured for tactile response as in a touch screen display. User input into the display 1350 may be registered at the processor 1310 and processed accordingly. Other devices may enable the computing device 1300 to communicate with one or more other computing devices, either by hardwire or wirelessly. Such communication can occur via Input/Output (I/O) interfaces/ports 1360.

The computing device 1300, through the I/O interface/ports 1360, may communicate with one or more networks such as a local area network (LAN), a general wide area network (WAN), and/or a public network (e.g., the Internet) via a network adapter as is commonly known in the art. Each of the operating system, one or more application programs, other program modules, and program data or some combination thereof, may include an implementation of a networking environment. In some embodiments, the computing device 1300 may be a cloud computing node connected to a cloud computing network (for example cloud environment 120 shown in FIG. 1). The computer computing device 1300 may be practiced in distributed cloud computing environments where tasks are performed by remote processing devices that are linked through a communications network. In a distributed cloud computing environment, program modules may be located in both local and remote computer system storage media including memory storage devices.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "module", "circuit", or "system." Furthermore, aspects of the disclosed invention may take the form of a computer program product embodied in one or more computer readable media having computer readable program code embodied thereon. In some embodiments, the output of the computer program product provides an electronic user interface on the display 1350 which may be controlled via direct contact with the display 1350 or via the I/O interfaces 960 (which may be for example, interface devices such as keyboards, touchpads, a mouse, a stylus, or the like).

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 1310 of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks in the figures.

Those of skill in the art would appreciate that various components and blocks may be arranged differently (e.g., arranged in a different order, or partitioned in a different way) all without departing from the scope of the subject technology. The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

Thus, the claims are not intended to be limited to the aspects shown herein, but are to be accorded the full scope consistent with the language of claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer program product for an online search engine generating search query results, the computer program product comprising a non-transitory computer readable storage medium having computer readable program code embodied therewith, the computer readable program code being configured, when executed by a processor, to:
   generate a user interface (UI) on a computing device with an electronic display;
   generate a search query field configured to receive a user's search query topic;
   receive the search query topic;
   retrieve from one or more online data sources, values of the search query topic, wherein the values of the search query topic are assembled as a primary set of time series data;
   retrieve values of a plurality of factors associated with the search query topic, wherein:
      the plurality of factors are distinct from the search query topic, and
      the values of the plurality of factors are assembled into secondary sets of time series data, distinct from the values of the search query topic stored as the primary set of time series data;
   determine a predictive ability value of two or more of the secondary sets of time series data, for the primary set of time series data, wherein determining the predictive ability value comprises:
      providing the two or more of the secondary sets of time series data to a prediction model,
      predicting, using the prediction model, a first value for a future value of the primary set of time series data, using a selected one of the secondary sets of time series data,
      predicting, using the prediction model, a second value for the future value of the primary set of time series data, without using the selected one of the secondary sets of time series data, and
      determining a difference between the first value for the future value of the primary set of time series data and the second value for the future value of the primary set of time series data, wherein the difference is the predictive ability value of the selected one of the secondary sets of time series data on the primary set of time series data of the search query topic;
   set a threshold value for the determined predictive ability value;
   rank the secondary sets of time series data based on the determined predictive ability value of respective secondary sets of time series data;
   determine additional predicted future values of time series data for the search query topic based on secondary sets of time series data ranked above the threshold value;
   determine one or more factors with the determined predictive ability value above the threshold value as most influencing the search query topic; and
   display the additional future predicted values of time series data for the search query topic and the one or more factors most influencing the search query topic, in the user interface.

2. The computer program product of claim 1, further comprising computer readable code configured to: supply the factors most influencing the search query topic to a neural network model; and generate, by the neural network model, a predicted conditional distribution of future values of the search query topic based on the factors most influencing the search query topic.

3. The computer program product of claim 2, further comprising computer readable code configured to: generate a feature in the UI, wherein the feature is configured to let a user edit, add to, delete from, or change one of the displayed factors most influencing the search query topic; re-generate, by the neural network model, the predicted conditional distribution of future values of the search query topic in response to the user edited, added, deleted or changed displayed factors most influencing the search query topic; and Filing Date: Mar. 9, 2021 display in the UI changed predictions of the conditional distribution of future values of the search query topic.

4. The computer program product of claim 1, further comprising computer readable code configured to: display, in the UI, a graphical representation of the factors most influencing the search query topic as a network of nodes pointing to a label of the search query topic; configure the nodes in the UI, to be selectable; in response to a user selection of a node, display as a pop-up graphic, an underlying data source for the factors most influencing the search query topic represented by the selected node.

5. The computer program product of claim 4, further comprising computer readable code configured to: include a user selectable feature in the UI configured to edit the selected node from the network of nodes; and display a change in a forecast of predicted future values for the search query topic based on the edit to the selected node.

6. A method of generating search query results and operating an online search engine, comprising:
   generating a user interface (UI) on a computing device with an electronic display;
   generating a search query field configured to receive a user's search query topic;
   receiving the search query topic;
   retrieving from one or more online data sources, values of the search query topic, wherein the values of the search query topic are assembled as a primary set of time series data;

retrieving values of a plurality of factors associated with the search query topic, wherein:
the plurality of factors are distinct from the search query topic, and
the values of the plurality of factors are assembled into secondary sets of time series data, distinct from the values of the search query topic stored as the primary set of time series data;
determining a predictive ability value of two or more of the secondary sets of time series data, for the primary set of time series data, wherein determining the predictive ability value comprises:
providing the two or more of the secondary sets of time series data to a prediction model,
predicting, using the prediction model, a first value for a future value of the primary set of time series data, using a selected one of the secondary sets of time series data,
predicting, using the prediction model, a second value for the future value of the primary set of time series data, without using the selected one of the secondary sets of time series data, and
determining a difference between the first value for the future value of the primary set of time series data and the second value for the future value of the primary set of time series data, wherein the difference is the predictive ability value of the selected one of the secondary sets of time series data on the primary set of time series data of the search query topic;
setting a threshold value for the determined predictive ability value;
rank the secondary sets of time series data based on the determined predictive ability value of respective secondary sets of time series data;
determining additional predicted future values of time series data for the search query topic based on secondary sets of time series data ranked above the threshold value;
determining one or more factors with the determined predictive ability value above the threshold value as most influencing the search query topic; and
displaying the additional future predicted values of time series data for the search query topic and the one or more factors most influencing the search query topic, in the user interface.

7. The method of claim 6, further comprising: supplying the factors most influencing the search query topic to a neural network model; and generating, by the neural network model, a predicted conditional distribution of future values of the search query topic based on the factors most influencing the search query topic.

8. The method of claim 7, further comprising: generating a feature in the UI, wherein the feature is configured to let a user edit, add to, delete from, or change one of the displayed factors most influencing the search query topic; re-generating, by the neural network model, the predicted conditional distribution of future values of the search query topic in response to the user edited, added, deleted or changed displayed factors most influencing the search query topic; and displaying in the UI changed predictions of the conditional distribution of future values of the search query topic.

9. The method of claim 6, further comprising: displaying, in the UI, a graphical representation of the factors most influencing the search query topic as a network of nodes pointing to a label of the search query topic; configuring the nodes in the UI, to be selectable; in response to a user selection of a node, displaying as a pop-up graphic, an underlying data source for the factors most influencing the search query topic represented by the selected node.

10. The method of claim 9, further comprising: including a user selectable feature in the UI configured to edit the selected node from the network of nodes; and displaying a change in a forecast of predicted future values for the search query topic based on the edit to the selected node.

11. An online host server, comprising: a network connection; a memory storage device; and a processor coupled to the network connection and connected to the memory storage device, wherein computer executable instructions in the memory storage device configure the processor to: generate a user interface (UI) on a computing device with an electronic display; generate a search query field configured to receive a user's search query topic; receive the search query topic; retrieve from one or more online data sources, values of the search query topic, wherein the values of the search query topic are assembled as a primary set of time series data; retrieve values of a plurality of candidate factors associated with the search query topic, wherein: the plurality of candidate factors are distinct from the search query topic, and they are obtained by: assembling the values of the plurality of candidate factors into random secondary sets of time series data; determining an optimized quantile regression loss of two or more of random secondary sets of time series data, for the primary set of time series data wherein for each secondary random set, a quantile regression is run resulting in a single number; and computing a predictive ability value for every candidate factor from the optimized quantile regression losses; set a threshold for the determined predictive ability value; rank the candidate factors by the determined predictive ability value; determine one or more candidate factors with the determined predictive ability value above the threshold as most influencing the search query topic; determine a predicted conditional distribution of a future value of the search query topic at a forecast horizon value of time series data for the search query topic, comprising the candidate factors with the predicative ability value ranked above the threshold; and Filing Date: Mar. 9, 2021 display the predicted conditional distribution of the future value at the forecast horizon of time series data for the search query topic and the one or more candidate factors most influencing the search query topic, in the user interface.

12. The host server of claim 11, wherein the processor is configured to: supply the ranked candidate factors most influencing the search query topic to a neural network model; and generate, by the neural network model, a predicted conditional distribution of future values of the search query topic based on the ranked factors most influencing the search query topic.

13. The host server of claim 12, wherein the processor is configured to: generate a feature in the UI, wherein the feature is configured to let a user edit, add to, delete from, or change one of the displayed candidate factors most influencing the search query topic; re-generate, by the neural network model, the predicted conditional distribution of future values of the search query topic in response to the user edited, added, deleted or changed displayed candidate factors most influencing the search query topic; and display in the UI changed predictions of the conditional distribution of future values of the search query topic.

14. The host server of claim 11, wherein the processor is configured to: supply the random secondary sets of time series of data to a neural network model; and train the neural network model to determine the predictive ability value of a time series using the random secondary sets of time series of data.

* * * * *

UNITED STATES PATENT AND TRADEMARK OFFICE
CERTIFICATE OF CORRECTION

PATENT NO. : 11,893,069 B2
APPLICATION NO. : 17/196850
DATED : February 6, 2024
INVENTOR(S) : Jencir Lee It is certified that error appears in the above-identified patent and that said Letters Patent is hereby corrected as shown below:

In the Claims

Claim 3, the phrase "Filing Date: Mar. 9, 2021" at Column 16, Line 39 needs to be deleted.

Claim 11, the phrase "Filing Date: Mar. 9, 2021" at Column 18, Lines 44-45 needs to be deleted.

Claim 14, the phrase "Filing Date: Mar. 9, 2021" at Column 19, Lines 3-4 needs to be deleted.

Signed and Sealed this
Second Day of July, 2024

Katherine Kelly Vidal
*Director of the United States Patent and Trademark Office*